US012684194B2

(12) United States Patent

Smith

(10) Patent No.: US 12,684,194 B2

(45) Date of Patent: Jul. 14, 2026

(54) METHODS AND APPARATUS TO POSITION ANTENNAS

(71) Applicant: DIRECTV, LLC, El Segundo, CA (US)

(72) Inventor: Alan Smith, Anaheim, CA (US)

(73) Assignee: DIRECTV, LLC, El Segundo, CA (US)

( * ) Notice: Subject to any disclaimer, the term of this patent is extended or adjusted under 35 U.S.C. 154(b) by 14 days.

(21) Appl. No.: 18/653,560

(22) Filed: May 2, 2024

(65) Prior Publication Data

US 2025/0343969 A1     Nov. 6, 2025

(51) Int. Cl.
      H04N 21/442      (2011.01)
      H04N 21/414      (2011.01)
      H04N 21/61       (2011.01)

(52) U.S. Cl.
      CPC ..... H04N 21/44209 (2013.01); H04N 21/414 (2013.01); H04N 21/6112 (2013.01)

(58) Field of Classification Search
      CPC ......... H04N 21/25841; H04N 21/4524; H04N 21/42222; H04N 21/422
      See application file for complete search history.

(56) References Cited

U.S. PATENT DOCUMENTS

| | | |
|---|---|---|
| 5,574,509 A | 11/1996 | Citta et al. |
| 5,940,028 A | 8/1999 | Iwamura |
| 6,229,480 B1 | 5/2001 | Shintani |

| | | | |
|---|---|---|---|
| 7,275,254 B1 * | 9/2007 | Jutzi | ...................... H04N 17/04 |
| | | | 348/192 |
| 7,286,190 B2 | 10/2007 | Klopfenstein et al. | |
| 7,589,793 B2 * | 9/2009 | Yang | ............... H04N 21/42607 |
| | | | 348/553 |
| 7,685,621 B2 * | 3/2010 | Matsuo | .............. H04N 21/4622 |
| | | | 725/38 |
| 7,710,325 B2 | 5/2010 | Cheng | |
| 8,155,599 B2 | 4/2012 | Kato et al. | |

(Continued)

OTHER PUBLICATIONS

Winegard Company, "Winegard Rayzar Portable Amplified HDTV Antenna Instruction Manual Model RV-RZ85," dated 2012, revised Jul. 2016 , retrieved from www.winegard.com, 6 pages.

(Continued)

*Primary Examiner* — Jason Salce

(74) *Attorney, Agent, or Firm* — Hanley, Flight & Zimmerman, LLC

(57) ABSTRACT

Systems, apparatus, articles of manufacture, and methods are disclosed. An example mobile device includes memory; machine-readable instructions; and programmable circuitry to at least one of instantiate or execute the machine-readable instructions to: receive a first ultra-wide band (UWB) communication from an antenna device; determine the antenna device is located at a second position based on the first UWB communication; determine a receivability score based on estimated signal strengths of one or more broadcast signals at the second position; report the receivability score to a user; determine the antenna device has moved to a third position based on a second UWB communication; update the receivability score based on signal strengths at the third position; and report the updated receivability score to the user.

20 Claims, 17 Drawing Sheets

(56)     References Cited

U.S. PATENT DOCUMENTS

| | | | |
|---|---|---|---|
| 8,285,223 B2* | 10/2012 | Unger | H04N 21/44227 |
| | | | 348/559 |
| 8,466,965 B2* | 6/2013 | Murphy | H01Q 1/125 |
| | | | 348/184 |
| 8,799,946 B2* | 8/2014 | Cake | H04N 21/44209 |
| | | | 725/39 |
| 10,091,539 B1* | 10/2018 | Kotian | H04N 21/6543 |
| 10,609,456 B2* | 3/2020 | Petruzzelli | H01Q 21/28 |
| 2012/0042340 A1* | 2/2012 | Naka | H04N 21/485 |
| | | | 725/37 |
| 2013/0271317 A1* | 10/2013 | Goel | G01S 19/23 |
| | | | 342/357.62 |
| 2022/0045772 A1* | 2/2022 | El-Hassan | H04W 52/42 |
| 2022/0264172 A1* | 8/2022 | Matsimanis | H04W 4/021 |
| 2024/0171802 A1* | 5/2024 | Qian | H04N 21/4312 |
| 2024/0323471 A1* | 9/2024 | Gorman | H04N 21/643 |

OTHER PUBLICATIONS

Directv, "Local Broadcast Strength Detector," retrieved from https://www.directv.com/signal-strength on May 2, 2024, 1 page.

* cited by examiner

METHODS AND APPARATUS TO POSITION ANTENNAS

FIELD OF THE DISCLOSURE

This disclosure relates generally to antennas, and, more particularly, to methods and apparatus to position antennas.

BACKGROUND

A variety of infrastructure systems can be used to deliver video media to users. For example, Over The Top (OTT) systems deliver video media over a network (e.g., the Internet). In other examples, Over The Air (OTA) systems use broadcast devices to wirelessly transmit video media using radio waves. Accordingly, OTA systems also include an antenna device to receive the radio waves and provide a video signal to a decoder device such as a television or set-top box.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
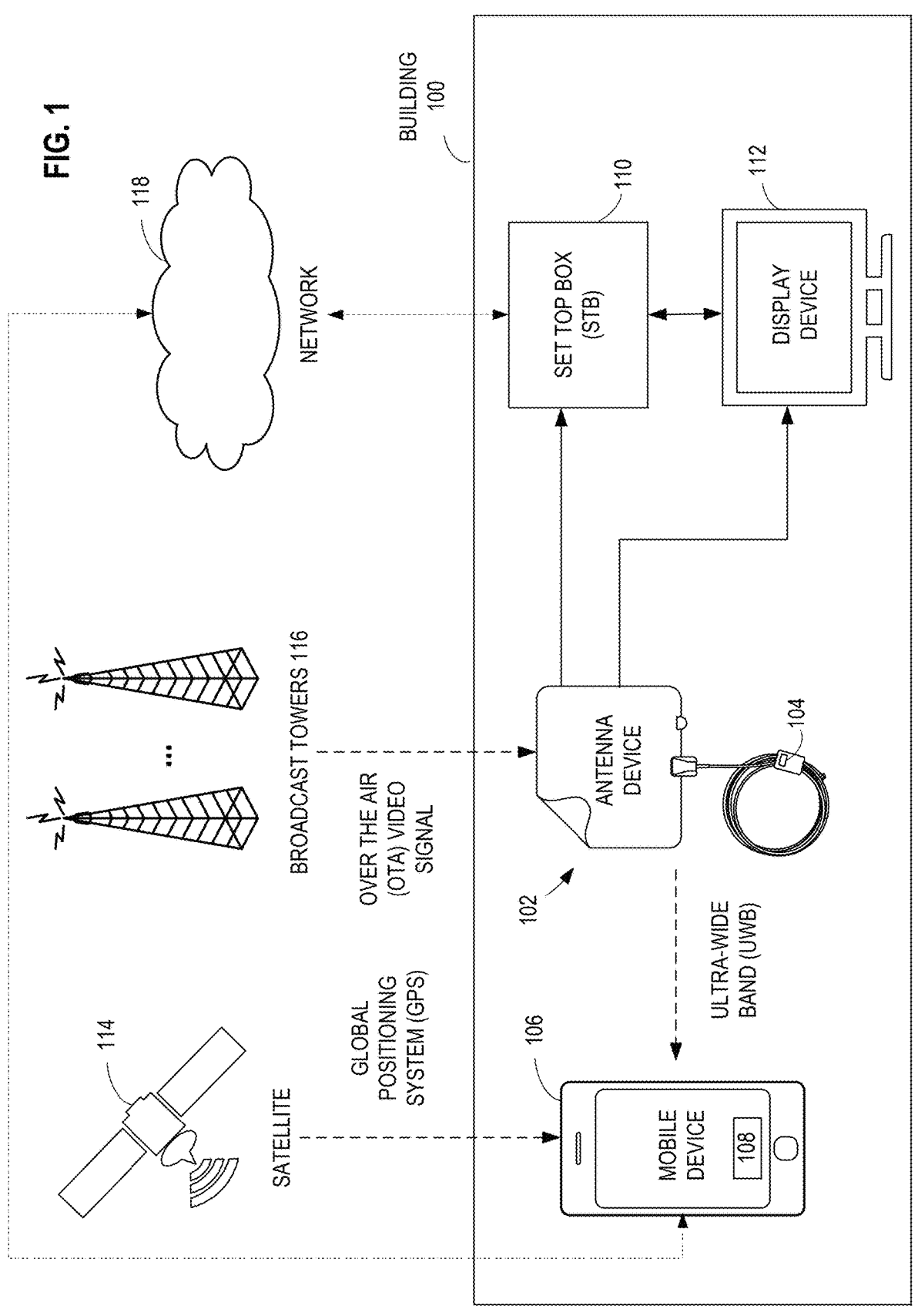
FIG. 1 is a block diagram of an example environment in which an example antenna device communicates with a mobile device using Ultra-Wide Band (UWB).

The quality of video media obtained using OTA systems can vary based on the signal strength of broadcast signals received by an antenna device. In some examples, a display device can present video streams when an antenna device is located at a first position within the building but cannot present the video streams when the same antenna device is located at a second position within the same building. Accordingly, the placement (e.g., position or location) of an antenna device can make a substantial impact on user experience when viewing video media from OTA systems. In some examples, the terms "position" and "location" may be used interchangeably to describe where an antenna device is placed. As used herein, signal strength refers to the power within a broadcast signal when the signal is received by an antenna device. In general, media can be presented at a higher quality as the signal strength of the signal that transmits said media increases.

Users can employ different approaches when determining where to place an antenna device within a building. In a first approach, users arbitrarily place the antenna device and measure the effectiveness of the position by running a channel scan on the display device. With such an approach, the user may have to attempt multiple positions for the antenna device if the subsequent channel scans indicate quality of the video media is unsatisfactory. Moving an antenna device multiple times and performing multiple channel scans are time consuming and tedious tasks. Moreover, the foregoing manual approach fails to provide the user with any assurance that the next antenna position they attempt will receive video media at a higher quality than any of the previous attempted positions.

As used herein, the quality of video media received at a given antenna position is a subjective determination that corresponds to user experience. Users may determine the quality of received video media based on any number of factors, including but not limited to the number of video streams (e.g., linear television channels) received by the antenna device, the amount of noise present on the received video streams, etc.

Users can also attempt to determine an antenna position based on third-party applications. Such applications may show the locations of nearby broadcast towers and provide rough directional information to describe the location of the user relative to the broadcast towers. However, a user engaging with such a third-party application still needs to manually predict a high-quality antenna position based on the rough directional information. Moreover, the third-party applications have no direct communication with the antenna device or the display device. Therefore, a user engaging with a third-party application still must run a channel scan on the display device to obtain any feedback corresponding to the selected antenna position. Furthermore, a third-party application fails to provide the user with any assurance that the antenna position they have manually selected will receive video media at a higher quality than any of the previous attempted positions.

Example methods, apparatus, and systems described herein provide recommendations and real time feedback to a user for antenna placement. Example antenna position circuitry may provide a recommendation by determining a receivability score for various candidate antenna positions within a building. The antenna position circuitry determines the receivability score based on a number of factors including but not limited to estimations of signal strength and user preference data. The antenna position circuitry updates a user interface (UI) to suggest the user move in a certain direction (e.g., towards the recommended antenna position). The antenna position circuitry causes the UI to continuously update the receivability score as the user moves with the antenna device. The antenna position circuitry ensures the mobile device is near an antenna device based on Ultra-Wide Band (UWB) communication with the antenna device. By engaging with the UI controlled by the example antenna positioner circuitry, users can obtain recommendations and real time feedback of antenna position without having to connect the antenna device to a display device and run a channel scan. Accordingly, example methods, systems and apparatus described herein can improve the user experience of placing an antenna device for OTA video media than other techniques to place an antenna. Example methods, systems and apparatus described herein can also cause the user to place the antenna device in a position that corresponds to higher quality video media than a position determined using other techniques.

FIG. 1 is a block diagram of an example environment in which an example antenna device communicates with a mobile device using Ultra-Wide Band (UWB). FIG. 1 includes an example building 100 where an example antenna device 102, an example mobile device 106, example set top box (STB) 110, and an example display device 112 are located. The antenna device 102 includes example UWB amplifier circuitry 104, and the mobile device 106 includes example antenna positioner circuitry 108. FIG. 1 also includes an example satellite 114, an example broadcast tower 116, and an example network 118.

Within the building 100, the antenna device 102 refers to any device that can both receive OTA video signals and communicate using UWB. The antenna device 102 may be implemented within a particular form factor based on a range of frequencies in which the antenna device intends to OTA video signals. The form factor may also be based on where and how the antenna device 102 is positioned within a building. In the example of FIG. 1, components within the antenna device 102 that receive the OTA video signals are implemented within flat packaging designed to stick (e.g., cling to) a wall or window. The components within the flat packaging of FIG. 1 have a wired connection to a separate housing where the UWB amplifier circuitry 104 is implemented. In other examples, the antenna device 102 refers to a device that receives a different frequency range of radio waves and/or is implemented with a different form factor. In examples described herein, the antenna device 102 may connect to either the STB 110 or the display device 112. The antenna device 102 is discussed further in connection with FIG. 2.

The mobile device 106 refers to any device that: a) can communicate with external devices to determine its own geographic location, b) can communicate with external devices using UWB, and c) is powered by a battery. In the example of FIG. 1, the mobile device 106 is a smart phone. In other examples, the mobile device 106 may be implemented by a different type of device including but not limited to a tablet, a smart watch or other type of wearable device, etc. The mobile device 106 is discussed further in connection with FIG. 3.

The mobile device 106 implements the antenna positioner circuitry 108 as described in the teachings herein. The antenna positioner circuitry 108 causes the mobile device 106 to present a user interface with a continuously updating receivability score. As used herein, a receivability score is a metric that quantifies and approximates a user's experience viewing OTA video streams if the antenna position was left at its current position. In some examples, the antenna positioner circuitry 108 also updates the user interface to suggest the use of a different antenna device, obtains user preferences, and/or suggests the user move in a particular direction. In doing so, the antenna positioner circuitry 108 improves the user experience associated with placing the antenna device 102 and/or viewing OTA video signals. In examples used herein, the terms "video stream" and "video signal" may be used interchangeably.

The antenna positioner circuitry 108 may be implemented using any type of programmable circuitry. Examples of programmable circuitry include but are not limited to programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). The antenna positioner circuitry 108 is discussed further in connection with FIG. 3.

The STB 110 improves and/or augments user experiences associated with the display device 112. For example, the STB 110 may provide a graphical interface on the display device 112 that allows the user to select between the different OTA video streams received by antenna device 102. The STB 110 may additionally or alternatively cause the display device 112 to present provide OTT video streams received from the network 118, digitally record segments of one or more video steams for future playback, execute web-based applications, etc.

In examples where the antenna device 102 connects to the STB 110, the STB 110 additionally tunes and/or decodes the OTA video signal from the antenna device 102. The STB 110 then provides the corresponding media data to the display device 112 for presentation. In other examples, the display device 112 does not connect to a STB.

The display device 112 refers to any device that can present OTA video signals on a screen. In the example of FIG. 1, the display device 112 is a digital television (TV). In other examples, the display device 112 may be implemented as an analog TV (e.g., a TV that Cathode Ray Tube), a computer monitor, etc. In example implementations of the building 100 that do not include the STB 110, the antenna device 102 connects directly to the display device 112. In such examples, the display device 112 may perform tuning and/or decoding operations to the OTA video signal before presenting the corresponding media.

The satellite 114 generates Global Navigation Satellite System (GNSS) that describes the geographic location of the mobile device. In the example of FIG. 1, the GNSS data is Global Positioning System (GPS) data. In other examples, the GNSS data is in a different format (e.g., Galileo data as used in Europe). While FIG. 1 shows a singular satellite for simplicity, in practice, any number of satellites may communicate with each other and with the mobile device 106 to determine the geographic location of the mobile device. The antenna positioner circuitry 108 uses the GNSS data to determine a receivability score as discussed further below.

The broadcast towers 116 refer to any devices that use radio waves to transmit OTA video signals to the antenna device 102. In some examples, one or more of the broadcast towers 116 may be referred to as broadcast towers, radio masts, etc. The broadcast towers 116 may receive refer to any number of structures, and a given structure may transmit any number of OTA video signals to the antenna device 102. Similarly, the broadcast towers 116 may transmit the OTA video signals using any range of frequencies within the radio band of the electromagnetic spectrum (e.g., approximately 30 Hertz (Hz) to 300 Gigahertz (GHz)).

The network 118 enables the mobile device 106 to communicate with external devices to determine the approximate number and location of the broadcast towers 116. In the example of FIG. 1, the network 118 also enables a connection between the STB 110 and other devices such that the STB 110 can present OTT content on the display device 112. In other examples, the network 118 connects to a different device (e.g., the display device 112) within the building 100 instead of the STB 110. In still other examples, the mobile device 106 is the only device in the building 100 connected to the network 118.

In this example, the network 118 is the Internet. However, the example network 118 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

UWB communication refers to the exchange of data using radio waves between approximately 3.1 GHz and 10.6 GHz. This relatively high frequency enables the antenna positioner circuitry 108 to perform time of flight (TOF) operations with UWB data received from the antenna device 102. By performing the TOF operations, the antenna positioner circuitry 108 can determine the position of the antenna device 102 relative to the mobile device 106 with a high degree of accuracy (e.g., with a resolution of approximately 5-10 centimeters (cm)). In contrast, other wireless communication standards such as Bluetooth® and Wi-Fi® can only be used to locate a device with resolutions of approximately five meters and ten meters, respectively.

Furthermore, UWB communication requires a relatively low amount of power consumption compared to other wireless communication standards (e.g., Wi-Fi®). Accordingly, the antenna device 102 is implemented such that UWB amplifier circuitry 104 can still receive power and operate when the antenna device 102 is disconnected from the display device 112. In the example of FIG. 1, the UWB amplifier circuitry 104 is connected to a Universal Serial Bus (USB port) and thus can be powered by an external battery pack. In other examples, the antenna device 102 may be implemented with an embedded cell battery that is integrated within the same housing as the UWB amplifier circuitry 104 and can independently power the UWB amplifier circuitry 104.

Communication with the antenna device 102 via UWB enables the antenna positioner circuitry 108 to continuously confirm that the antenna device 102 is in close proximity to the mobile device 106. The antenna positioner circuitry 108 then uses the GPS data of the mobile device 106 as an analog to the geographic location of the antenna device 102, relying on the UWB communication to continuously confirm the proximity of the two devices to do so.

By determining the geographic location of the antenna device 102 in a manner that is accurate to the level of GPS (e.g., a few meters) and continuously updating, the antenna positioner circuitry 108 can provide the user with a receivability score that updates in real time as the user moves with the mobile device 106 and the antenna device 102 throughout the building. Accordingly, the antenna positioner circuitry 108 provides dynamic feedback relating to antenna position without requiring a connection between the antenna device 102 and the display device 112, thereby improving user experience and/or the quality of received OTA video signals compared to other antenna placement techniques.

Figure 2:
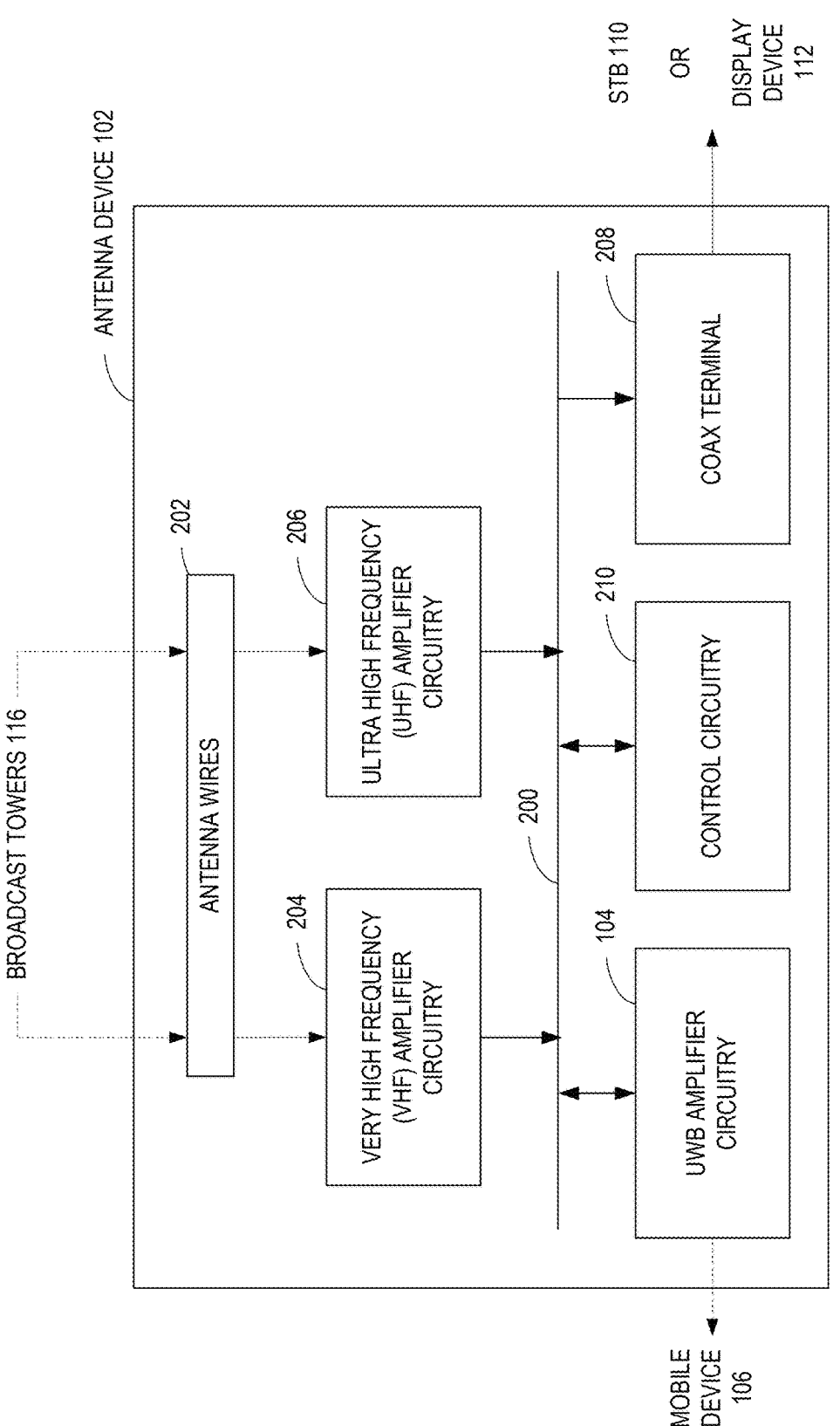
FIG. 2 is a block diagram of an example implementation of the antenna device of FIG. 1.

FIG. 2 is a block diagram of an example implementation of the antenna device 102 of FIG. 1. The antenna device 102 includes an example bus 200, example antenna wires 202, example Very High Frequency (VHF) amplifier circuitry 204, example Ultra High Frequency (UHF) amplifier circuitry 206, the example UWB amplifier circuitry 104, example control circuitry 210, and an example coaxial (coax) terminal 208.

The bus 200 refers to one or more physical connections (e.g., an interconnect, copper trace, etc.) that enables communication between the various components of the antenna device 102. The bus 200 may be implemented using one or more communication systems that meet pre-determined threshold power and latency requirements.

The antenna wires 202 refer to any component used to direct and focus the OTA video signal from a wireless medium (e.g., air) onto a wired medium (e.g., the bus 200 and a coax cable) so that the OTA video signal can be provided to the display device 112. The antenna wires 202 may be made of any conductive material and formed into any shape to direct some wavelengths better than others. In the example of FIG. 1, the antenna wires 202 are implemented in a different housing (e.g., the flat packaging designed to cling to a wall or window) than the other components o of the antenna device 102.

In the example of FIG. 2, the antenna wires 202 are configured to receive VHF signals and UHF signals. VHF refers to an industry-defined frequency range between 30 Megahertz (MHz) and 300 MHz. Similarly, UHF refers to an industry-defined frequency range between 300 MHz and 3 GHz. Accordingly, the VHF amplifier circuitry 204 amplifies (e.g., increases the magnitude of) video signals received within the VHF range and the UHF amplifier circuitry 206 amplifies video signals within the UHF range.

The antenna device 102 amplifies signals to counteract attenuation that may have occurred while the radio signal traversed a wireless medium. In some examples, the antenna device 102 implements one or more of the VHF amplifier circuitry 204, the UHF amplifier circuitry 206, and the UWB amplifier circuitry 104 with a single amplifier. Additionally or alternatively, the antenna device 102 may implement one or more of VHF amplifier circuitry 204, the UHF amplifier circuitry 206, and the UWB amplifier circuitry 104 on a single integrated circuit (IC).

In the example of FIG. 2, the VHF amplifier circuitry 204 and the UHF amplifier circuitry 206 provide the amplified signals to the coax terminal 208 via the bus 200 for transmission to the display device 112. In other examples, the VHF amplifier circuitry 204 and the UHF amplifier circuitry 206 provide the amplified signals to the control circuitry 210 for additional signal conditioning before video data is provided to the display device 112.

The coax terminal 208 provides an interface for the antenna device 102 to provide video signals to either the STB 110 or the display device 112. Coax is used in the example of FIG. 2 because the cables can transmit a large amount of analog information with little interference between the center core and surrounding shield, thereby making the cables capable of carrying radio frequency signals with little to no degradation in signal quality. In other examples, a different communication standard is used to transmit video data to the display device 112 using a wired or wireless medium.

The control circuitry 210 causes the UWB amplifier circuitry 104 to emit UWB signals such that the antenna positioner circuitry 108 can determine the location of the antenna device 102. The control circuitry 210 may use any suitable technique to emit UWB signals that convey relative location information when interpreted. Such techniques include but are not limited to Time Difference of Arrival (TDoA), Two Way Ranging (TWR), etc.

In some examples, the control circuitry 210 performs other operations in addition to causing the generation of UWB signals. Such additional operations may include but are not limited to adjusting configuration parameters (e.g., the gain) of one or more amplifier signals, performing signal conditioning, encryption, or formatting to video data, etc. The control circuitry 210 may be implemented using any type of programmable circuitry.

Figure 3:
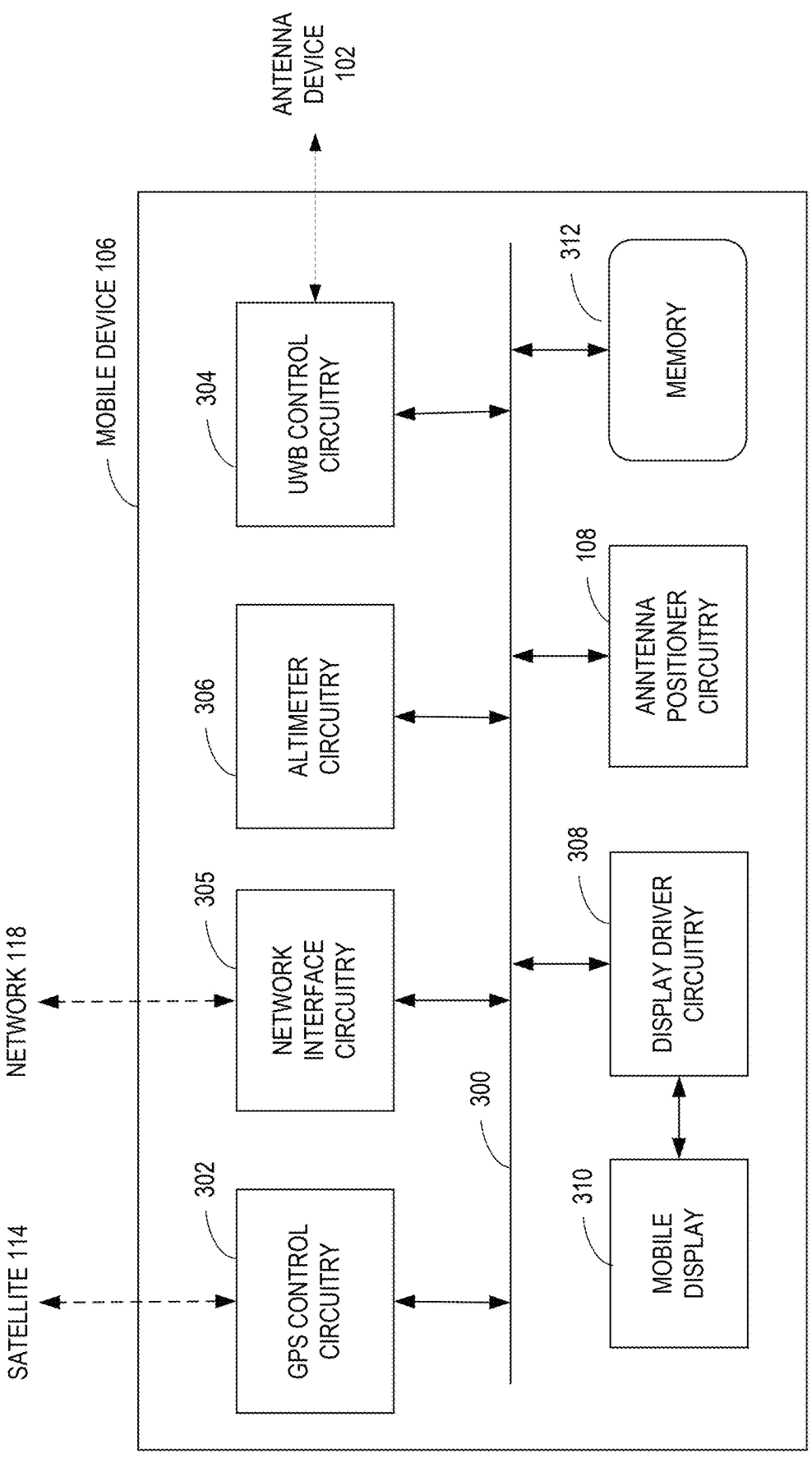
FIG. 3 is a block diagram of an example implementation of the mobile device of FIG. 1.

FIG. 3 is a block diagram of an example implementation of the mobile device 106 of FIG. 1. The mobile device 106 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the mobile device 106 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. FIG. 3 shows that the mobile device 106 includes an example bus 300, the example antenna positioner circuitry 108, example GPS control circuitry 302, example UWB control circuitry 304, example network interface circuitry 305, example altimeter circuitry 306, example display driver circuitry 308, an example mobile display 310, and an example memory 312.

The bus 300 refers to one or more physical connections (e.g., an interconnect, copper trace, etc.) that enables communication between the other components of the mobile device 106. The bus 300 may be implemented using one or more communication systems that meet pre-determined threshold power and latency requirements.

The GPS control circuitry 302 receives GPS signals from the satellite 114. The GPS control circuitry 302 may implement any number of hardware components to receive the GPS signals, including but not limited to amplifiers, antennas, etc. The GPS control circuitry 302 may also send messages to the satellite 114 to request GPS data, perform signal processing on the received signals, and/or perform other operations related to the management of GPS data. In some examples, the GPS control circuitry 302 is instantiated by programmable circuitry executing GPS instructions and/or configured to perform operations such as those represented by the flowchart(s) of FIGS. 10-13.

The UWB control circuitry 304 receives UWB signals received from the antenna device 102. The UWB control circuitry 304 may implement any number of hardware components to receive the UWB signals, including but not limited to amplifiers, antennas, etc. The UWB control circuitry 304 may also transmit UWB data to the antenna device 102 depending on what pre-determined technique is used to determine the relative location of the antenna device. Such techniques include but are not limited to TDoA, TWR, etc. as discussed above. In some examples, the GPS control circuitry 302 is instantiated by programmable circuitry executing GPS instructions and/or configured to perform operations such as those represented by the flowchart(s) of FIGS. 10-13.

The network interface circuitry 305 enables the various components of the mobile device 106 to communicate with external devices via the network 118. For example, the antenna positioner circuitry 108 may send instructions to the network interface circuitry 305 (via the bus 300) to communicate with other devices (e.g., web servers) over the network 118 to obtain various types of data to use as inputs to the receivability score. Such data may include but is not limited to the number, location, and performance characteristics of the broadcast towers 116, a description of the content within the OTA streams that are transmitted by the broadcast towers 116, topological data of the region surrounding the building 100, etc.

Other components of the mobile device 106 may additionally use the network interface circuitry 305 to perform various operations. The network interface circuitry 305 may include transceivers, antennas, and/or other hardware components required to send and receive data over the network 118. Similarly, the network interface circuitry 305 may implement one more network communication protocols to enable the exchange of data over the network 118.

The altimeter circuitry 306 generates data that describes the elevation of the mobile device 106. The altimeter circuitry 306 may include any number or types of sensors to determine the elevation of the mobile device 106. Such sensor types include but are not limited to pressure sensors, sonic sensors, radar, etc. Furthermore, the altimeter circuitry 306 may use any type of suitable technique or algorithm to combine the one or more sensor measurements into elevation data. In some examples, the altimeter circuitry 306 is instantiated by programmable circuitry executing altimeter instructions and/or configured to perform operations such as those represented by the flowchart(s) of FIGS. 10-13.

The antenna positioner circuitry 108 confirms that the data provided by UWB control circuitry 304 (via the bus 300) indicates the antenna device 102 is within a proximity (e.g., less than a threshold distance away) to the mobile device 106. When the antenna device 102 and the mobile device 106 are near one another, the antenna positioner circuitry 108 determines a receivability score based on the current position of the mobile device 106. The antenna positioner circuitry 108 may determine the current position by combining latitude and longitude data (e.g., x and y data in 3D space) from the GPS control circuitry 302 and elevation data (e.g., z data in 3D space) from the altimeter circuitry 306.

In the examples described herein, the antenna positioner circuitry 108 determines a new receivability score whenever any of the x, y, or z data changes, thereby updating the receivability score in substantially real time (recognizing there may be real world delays for computing time, transmission, etc.). In other examples, the antenna positioner circuitry 108 updates the receivability score in response to a determination that the one or more of the x, y, or z data has changed by a threshold amount relative to a previous measurement. Additionally, or alternatively, the antenna positioner circuitry 108 may update the receivability score after a threshold amount of time has passed since the last update to reduce computational resource usage. The operations performed by the antenna positioner circuitry 108 to determine the receivability score are discussed further in connection with FIGS. 10-13.

The antenna positioner circuitry 108 also sends instructions (via the bus 300) to cause the display driver circuitry 308 to present a user interface (UI) on the mobile display 310. The antenna positioner circuitry 108 controls the content of the UI to assist a user in placing the antenna device 102. The antenna positioner circuitry 108 may cause the UI to display any type of content, including but not limited to current and/or past receivability scores, suggestions to the user, instructions to the user, prompts for the user to enter preference information, etc. In some examples, the antenna positioner circuitry 108 implements a software application to determine the receivability score and/or control the content on the mobile display 310. In some examples, the antenna positioner circuitry 108 is instantiated by programmable circuitry executing antenna positioner instructions and/or configured to perform operations such as those represented by the flowchart(s) of FIGS. 10-13.

The display driver circuitry 308 implements a software application that allows an operating system (OS) to control the mobile display 310. In some examples, the antenna positioner circuitry 108 controls the foregoing UI by sending visual data (e.g., colors and pixel coordinates) to an OS, which in turn provides the visual data to the display driver circuitry 308. The display driver circuitry 308 then sends one or more control signals, based on the visual data, that cause the mobile display 310 to display the UI. The number and type of control signals generated by the display driver circuitry 308 may depend on the technology used to implement the mobile display 310. The mobile display 310 may be implemented using any suitable technology, including but not limited to Liquid Crystal Display (LCD), In-Plane Switching Liquid Crystal Display (IPS-LCD), Organic Light-Emitting Diode (OLED), Active-Matrix Organic Light-Emitting Diode (AMOLED), etc. In some examples, the display driver circuitry 308 is instantiated by programmable circuitry executing display driver instructions and/or configured to perform operations such as those represented by the flowchart(s) of FIGS. 10-13.

The memory 312 stores data used by the various components of the mobile device 106 to perform operations. For example, the memory 312 may store data describing the number and location of the broadcast towers 116, previous receivability score values and corresponding position data, user preferences, configuration and/or performance parameters of the antenna device 102, etc. The memory 312 may be implemented as any type of memory. For example, the memory 312 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

In examples described herein, the antenna positioner circuitry 108 is implemented within the mobile device 106 as shown in FIG. 3. In other examples, some or all of the functionality provided by the antenna positioner circuitry 108 may be implemented by one or more circuits within the antenna device 102. For example, the antenna device 102 may be implemented with receivability score circuitry that continuously calculates a receivability score based on the same inputs described herein with respect to the antenna positioner circuitry 108 (e.g., GPS, altimeter, and UWB data from the mobile device 106, a list of regional base stations with performance characteristics, the content of the corresponding OTA video signals, topological data, user preferences, etc.). In such examples, the receivability score circuitry within the antenna device 102 may send instructions to with the mobile device 106 to control the content of the UI presented on the mobile display 310 (e.g., to provide the receivability score to the user).

In some examples, the mobile device 106 includes means for determining a receivability score. For example, the means for determining a receivability score may be implemented by antenna positioner circuitry 108. In some examples, the antenna positioner circuitry 108 may be instantiated by programmable circuitry such as the example programmable circuitry 1412 of FIG. 14. For instance, the antenna positioner circuitry 108 may be instantiated by the example microprocessor 1500 of FIG. 15 executing machine executable instructions such as those implemented by at least blocks 1002-1022, 1102-1116, and 1302-1312 of FIGS. 10-13. In some examples, the antenna positioner circuitry 108 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the antenna positioner circuitry 108 may be instantiated by any other combination of hardware, software, and/or firmware. For example, the antenna positioner circuitry 108 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the mobile device 106 includes means for obtaining GNSS data. For example, the means for obtaining GNSS data may be implemented by GPS control circuitry 302. In some examples, the GPS control circuitry 302 may be instantiated by programmable circuitry such as the example programmable circuitry 1412 of FIG. 14. For instance, the GPS control circuitry 302 may be instantiated by the example microprocessor 1500 of FIG. 15 executing machine executable instructions such as those implemented by at least blocks 1018, 1020, 1108-1112, 1204, 1308 of FIGS. 10-13. In some examples, the GPS control circuitry 302 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the GPS control circuitry 302 may be instantiated by any other combination of hardware, software, and/or firmware. For example, the GPS control circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the mobile device 106 includes means for communicating over a network. For example, the means for communicating may be implemented by network interface circuitry 305. In some examples, the network interface circuitry 305 may be instantiated by programmable circuitry such as the example programmable circuitry 1412 of FIG. 14. For instance, the network interface circuitry 305 may be instantiated by the example microprocessor 1500 of FIG. 15 executing machine executable instructions such as those implemented by at least blocks 1008, 1202, 1204, 1210, 1302 of FIGS. 10-13. In some examples, the network interface circuitry 305 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the network interface circuitry 305 may be instantiated by any other combination of hardware, software, and/or firmware. For example, the network interface circuitry 305 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the mobile device 106 includes means for generating elevation data. For example, the means for generating elevation data may be implemented by altimeter circuitry 306. In some examples, the altimeter circuitry 306 may be instantiated by programmable circuitry such as the example programmable circuitry 1412 of FIG. 14. For instance, the altimeter circuitry 306 may be instantiated by the example microprocessor 1500 of FIG. 15 executing machine executable instructions such as those implemented by at least blocks 1008, 1012, 1204, 1308 of FIGS. 10-13. In some examples, the altimeter circuitry 306 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the altimeter circuitry 306 may be instantiated by any other combination of hardware, software, and/or firmware. For example, the altimeter circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the mobile device 106 includes means for communicating over UWB. For example, the means for communicating over UWB may be implemented by UWB control circuitry 304. In some examples, the UWB control circuitry 304 may be instantiated by programmable circuitry such as the example programmable circuitry 1412 of FIG. 14. For instance, the UWB control circuitry 304 may be instantiated by the example microprocessor 1500 of FIG. 15 executing machine executable instructions such as those implemented by at least blocks 1010, 1306 of FIGS. 10, 13. In some examples, the UWB control circuitry 304 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the UWB control circuitry 304 may be instantiated by any other combination of hardware, software, and/or firmware. For example, the UWB control circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

Figure 4:
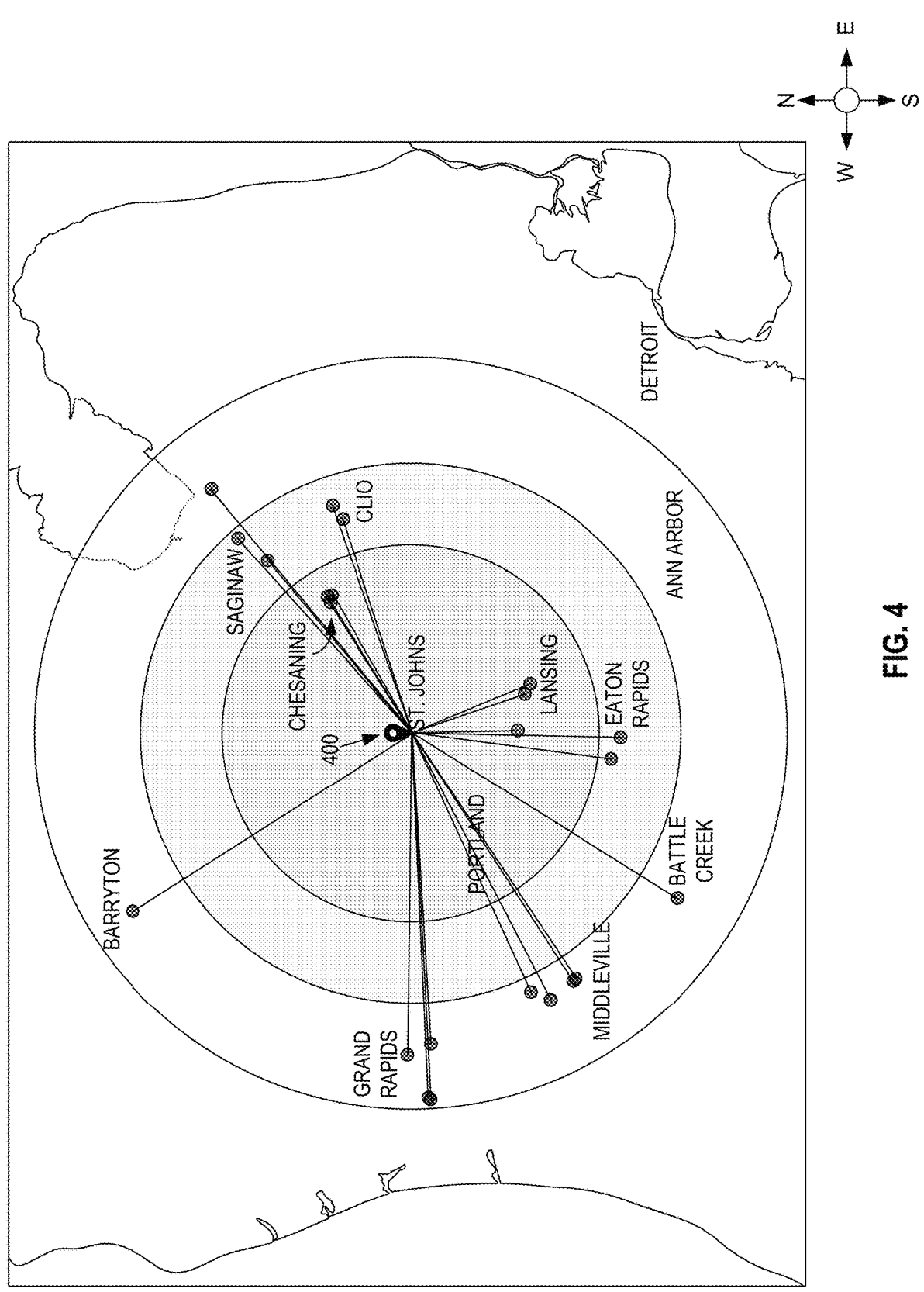
FIG. 4 is a map showing broadcast towers in a geographic region.

FIG. 4 is a map showing an example of broadcast towers in a geographic region. FIG. 4 shows the location of a building 400, which is an example implementation of the building 100 of FIG. 1. In the example of FIG. 4, the building 400 is in St. John's Michigan. In other examples, the building 400 may be implemented at any location.

FIG. 4 shows a number of data points located throughout the surrounding geographic region of the building 400 (e.g., a portion of Michigan's lower peninsula). The data points represent the locations of the broadcast towers 116 of FIG. 1. In general, the quality of an OTA video signal received by the antenna device 102 decreases as the distance between the antenna device and the source of the signal increase. Accordingly, when the building 400 receives OTA video signals using the antenna device 102, the signals transmitted from broadcast towers 116 located within the smallest circle (e.g., those located in Lansing and Chesaning) are likely to have a higher signal strength than the signals transmitted by broadcast towers 116 only within the medium sized circle (e.g., those located in Saginaw, Clio, and Eaton Rapids).

Similarly, the signals transmitted by broadcast towers 116 only within the medium circle are likely to be received at the building 400 with higher signal strength than the signals transmitted by broadcast towers 116 only within the medium sized circle (e.g., those located in Saginaw, Clio, and Eaton Rapids).

The examples described below refer only to locations within the smallest circle of FIG. 4 for simplicity. In practice, the antenna positioner circuitry 108 may consider broadcast towers at any distance away from the antenna device 102 when determining the receivability score. The antenna positioner circuitry 108 further determines the receivability score based, in part, on the notion that signal quality generally decreases as distance increases.

Figure 5:
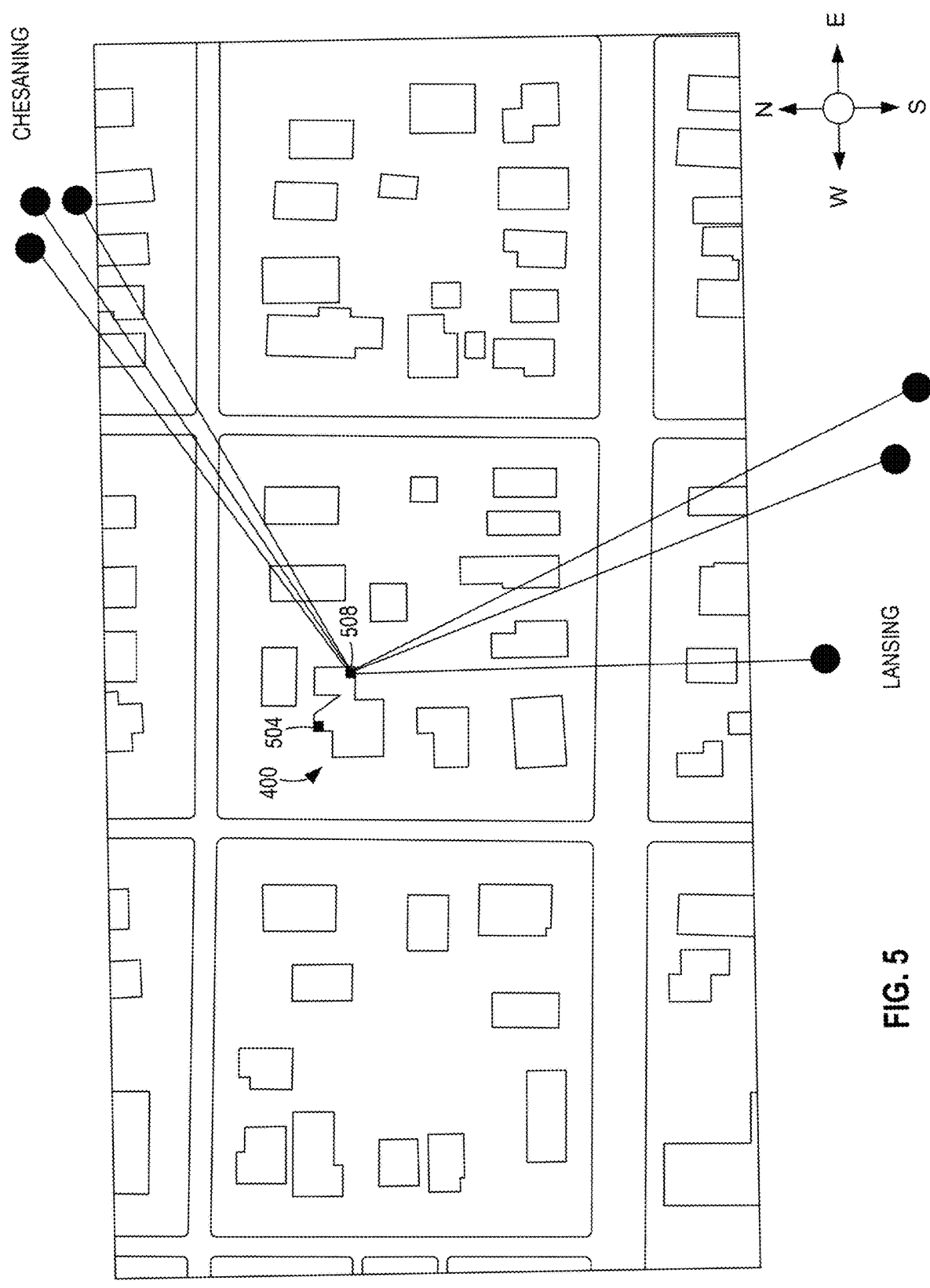
FIG. 5 is a map illustrating operations performed by the mobile device of FIG. 1 based on the broadcast towers of FIG. 4.

FIG. 5 is a map illustrating operations performed by the mobile device of FIG. 1 based on the broadcast towers of FIG. 4. Moreover, the map of FIG. 5 is a zoomed-in version of the map of FIG. 4. FIG. 5 is zoomed-in to show the shape of building 400 and the shape and position of neighboring buildings within St. Johns, Michigan. FIG. 5 also includes example positions 504 and 508 within the building 400.

In some examples, an initial position of the antenna device 102 is suboptimal because a different position within the same building 100 can cause the antenna device 102 to receive higher quality and/or more desirable OTA video signals. For example, in FIG. 5, the user initially places the antenna device at position 504. The user may make an initial selection at position 504 for any reason (e.g., it is in a home office or media cabinet, it is near a window, etc.) However, if the antenna device 102 were to obtain OTA video signals from the broadcast towers 116 in Lansing or Chesaning at position 504, the signals are likely to have relatively low signal strength. The low signal strength may occur because the position 504 is further away from the broadcast towers 116 than other positions within the building 400. Therefore, compared to other positions within the building 400, OTA video signals have to travel farther to reach the position 504 and may encounter additional obstacles. Such obstacles may include but are not limited to an internal or external of the building 400, walls of neighboring buildings, etc.

While moving the antenna device 102 within a building 100 can increase signal strength, the geographic orientation of the building 100 relative to the neighboring broadcast towers 116 may prevent the existence of a single position within the building 100 that can maximize the signal strengths of all receivable OTA streams. For example, FIG. 5 shows that some OTA streams arrive at the building 400 from the northeast (e.g., from Chesaning), while other OTA streams arrive from the south (e.g., from Lansing). Thus, the OTA streams from Lansing may have the highest possible signal strength if the antenna device 102 is placed on the southern wall of the building 400, while the OTA streams from Chesaning may have the highest possible signal strength if the antenna device 102 is placed in the northeast corner of the building 400. Similarly, OTA streams from Lansing may have relatively low signal strength in the northeast corner, and OTA streams from Chesaning have relatively low signal strength, because of the increased distance.

Advantageously, the antenna positioner circuitry 108 quantifies estimated changes to signal strength when updating the receivability score. Accordingly, in FIG. 5, the user chooses to move the antenna device 102 to position 508 in response to the UI on the mobile device 106 indicating the position 508 has a relatively high receivability score. In this example, the receivability score at position 508 is larger than receivability scores on the southern wall or northeast corner of the building because the position 508 balances the signal strengths of OTA streams from both Lansing and Chesaning.

The antenna positioner circuitry 108 also considers user preferences when updating the receivability score. As a result, the receivability score may prioritize attempts to maximize the signal strengths of OTA streams that interest the user over attempts to maximize the signal. For example, suppose the user selected (through the UI on the mobile device 106) the OTA video streams from Lansing as "favorite channels", but did not make any selections of OTA video streams from Chesaning. In such an example, the antenna positioner circuitry 108 may cause the receivability score to be higher at the south wall than at the position 508 or the northeast corner of the building 400. That is, the user preference in such an example causes the antenna positioner circuitry 108 to attempt to maximize the signal strength of OTA streams from Lansing despite knowing that doing so will reduce the signal strength of OTA streams from Chesaning.

The antenna positioner circuitry 108 also considers the content of the OTA video signals when updating the receivability score. In some examples, the antenna device 102 receives the same content from two different base stations. Accordingly, it may be beneficial in such situations to deprioritize one base station and prioritize the other base station. For example, in FIG. 5 suppose the broadcast towers 116 in Lansing and the broadcast towers 116 in Chesaning both provide the same three channels. In such an example, the antenna positioner circuitry 108 may cause the receivability score to be lower at position 508 than at the south wall or northeast corner of the building 400. Such a change occurs because, in the forgoing example, maximizing the signal strengths of OTA streams from one direction is preferable over balancing the signal strengths of OTA streams from both directions. The operations performed by the antenna positioner circuitry 108 to determine the receivability score are discussed further in FIG. 12.

Figure 6:
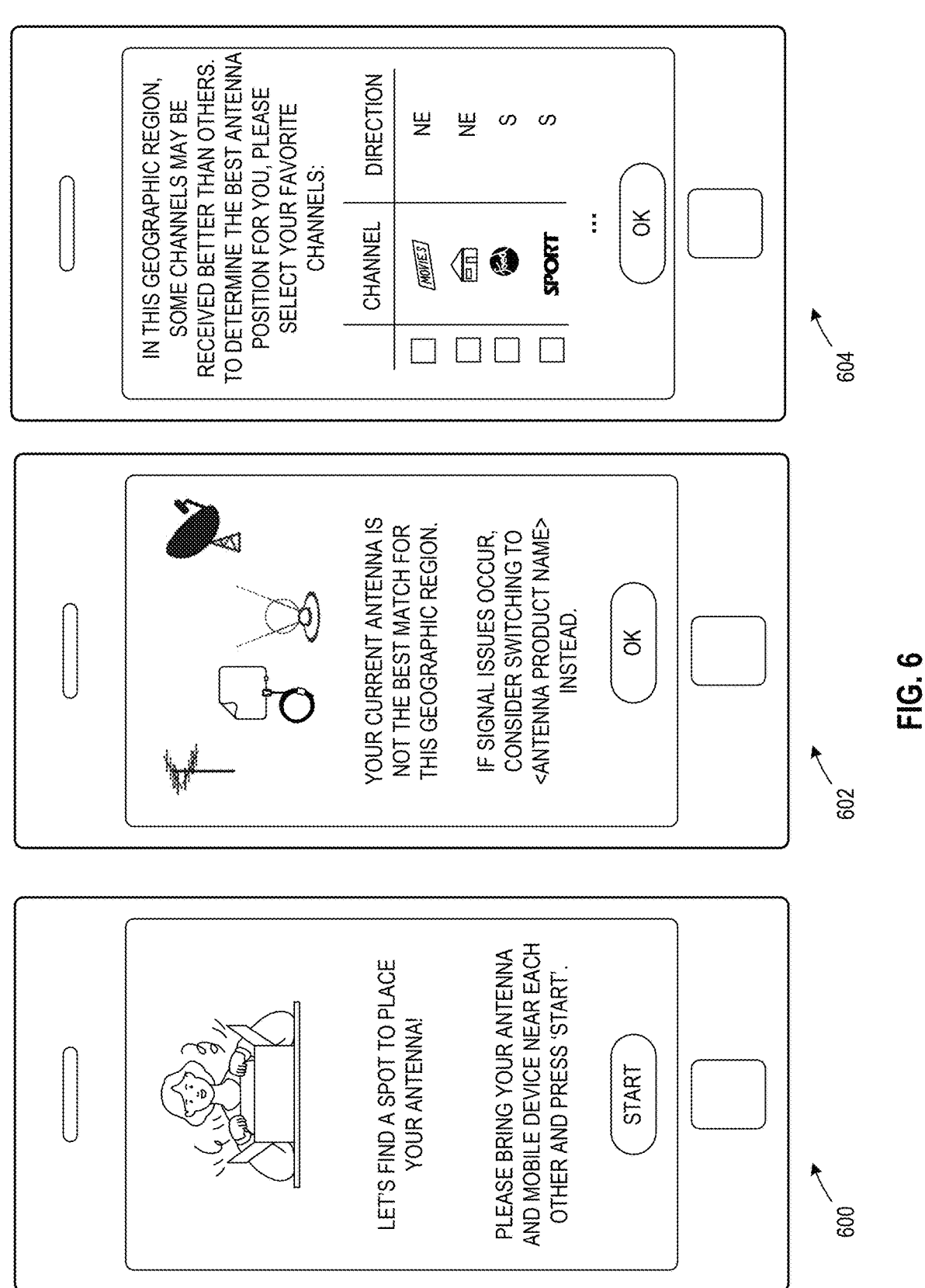
FIG. 6 includes illustrative examples of information presented on the mobile display of FIG. 3 based on operations performed by the mobile device of FIG. 1.

FIG. 6 are illustrative examples of information presented on the mobile display 310 based on operations performed by the antenna positioner circuitry 108. FIG. 6 includes example views 600, 602, and 604.

The UI controlled by the antenna positioner circuitry 108 may change based on any number of factors. The view 600 is an example implementation of the UI when the user first indicates they would like help placing the antenna device 102. The user may indicate the they would like help placing the antenna device 102 for any reason. Such reasons include but are not limited to buying a new antenna, setting up a pre-existing new antenna in a new building, a decrease in the signal quality that occurs after the antenna is plugged into the display device 112, etc. The user may indicate they would like help placing the antenna device 102 through any suitable technique (e.g., launching a software application managed by the antenna positioner circuitry 108, selecting a button on a menu, etc.).

Different types of antenna devices are designed to receive signals at different frequencies and from different distances. Accordingly, a user may inadvertently attempt to position an antenna device 102 that will result in relatively few OTA streams being receivable, and/or relatively low signal strengths for the OTA streams that are receivable, regardless of where the antenna device 102 is positioned within the building 100. In such examples, the view 602 shows that the antenna positioner circuitry 108 causes the UI to inform the user that the current antenna is not a good match for the geographic region. The view 602 also shows that the antenna positioner circuitry 108 may suggest an alternate antenna product for the user. The antenna positioner circuitry 108 determines when to present view 602 to the user, and which antenna product (if any) to suggest, based on properties of the geographic region (e.g., the locations of broadcast towers 116 relative to the building 100, topological data, etc.) and performance characteristics of various antenna devices on the market.

In some geographic regions (e.g., the region shown in FIG. 5), the building 400 is located relative to the broadcast towers 116 such that some receivable OTA streams may have higher signal strengths than others. In some such examples, the antenna positioner circuitry 108 can present the view 604 to provide the foregoing information to the user and to prompt the user to select favorite channels. The view 604 includes a list of receivable OTA streams indicated by their channel logo and checkboxes for the user to indicate which OTA streams they consider to be a favorite channel. In some examples, the view 604 includes additional data to aid the user. Such additional information may include but is not limited to the name of the channel, the direction of the corresponding base station relative to the building 400, etc.

In other examples, the antenna positioner circuitry 108 uses a technique other than a list of favorite channels to prioritize broadcast towers based on user preference. For instance, the antenna positioner circuitry 108 may cause the UI to display a prompt that reads: "which channels do you care about more? Option A: <Movie Channel> and <Home Channel>, Option B: <Food Channel> and <Sport Channel>, Option C: I don't have a preference." In such an example, the antenna positioner circuitry 108 groups the Movie Channel and Home Channel into a single option because the corresponding broadcast towers 116 are located in approximately the same direction (e.g., northeast) relative to the building 400. As such, any change to the position of the antenna device 102 is likely to increase or decrease the signal strengths of the Movie Channel and Home Channel by approximately the same amount. Similarly, any change to the position of the antenna device 102 is likely to increase or decrease the signal strengths of the Food Channel and Sport Channel by approximately the same amount because both corresponding broadcast towers are located approximately south of the building 400.

Notably, all of the Movie Channel, Home Channel, Food Channel, and Sports Channels in the foregoing example are OTA video signals (e.g., linear television channels) received wirelessly by the antenna device 102. Even when the building 100 is implemented with the STB 110 such that the display device 112 can display OTT streams (e.g., cable channels, Streaming Video on Demand (SVOD), etc.), the antenna positioner circuitry 108 does not need to include the OTT streams in the view 604 (and more generally, does not need to include the OTT streams in any request for user preferences) because OTT streams are provided over the network 118. Therefore, the quality of OTT streams is not dependent on the position of the antenna device 102.

Figure 7:
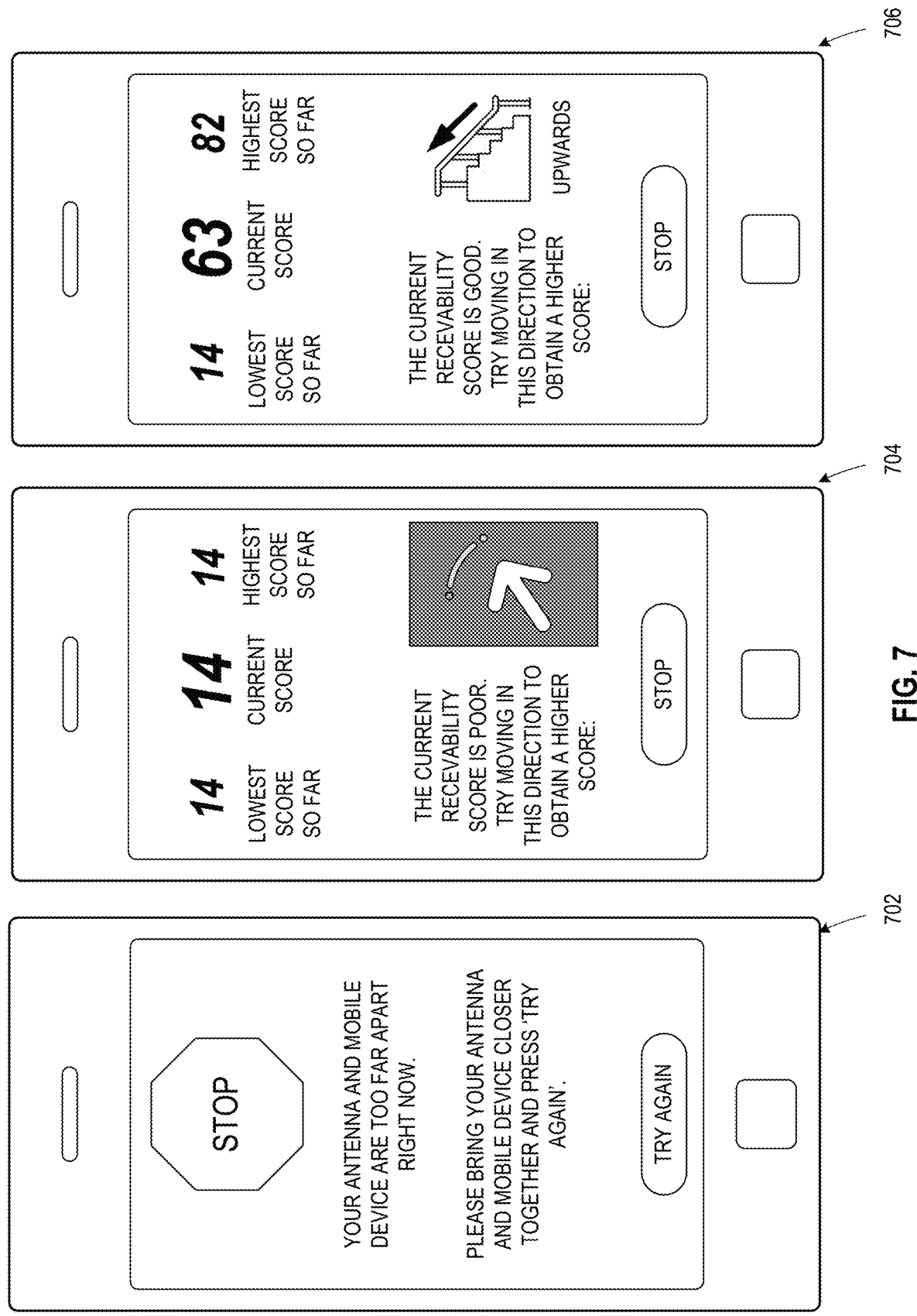
FIG. 7 includes additional illustrative examples of information presented on the mobile display of FIG. 3 based on operations performed by the mobile device of FIG. 1.

FIG. 7 includes additional illustrative examples of information presented on the mobile display 310 based on operations performed by the antenna positioner circuitry 108. FIG. 7 includes example views 702, 704, and 706.

After the user has requested help in positioning the antenna device 102, and after the antenna positioner circuitry 108 begins to repeatedly check the data from the UWB control circuitry 304 to confirm that the antenna device 102 is currently nearby the mobile device 106. If at any time the UWB data indicates that the distance between the antenna device 102 and the mobile device 106 is above a threshold, then the position of the mobile device 106 is not a reasonable approximation of the position of the antenna device 102. In such examples, the antenna positioner circuitry 108 provides the view 702 on the UI to instruct the user to bring the antenna device 102 and the mobile device 106 closer together. By ensuring the antenna device 102 and the mobile device 106 remain within a threshold distance from one another, the antenna positioner circuitry 108 can use the three-dimensional position of the mobile device 106 (as determined by the GPS control circuitry 302 and the altimeter circuitry 306) as proxy for the three-dimensional position of the antenna device 102 when determining the receivability score.

When the antenna device 102 and the mobile device 106 are within a threshold distance from one another, the user can move throughout the building 100 (while carrying both devices) and the antenna positioner circuitry 108 will provide and continuously update the receivability score on the UI. In the views 704 and 706, the receivability score is presented as a positive integer. The antenna positioner circuitry 108 may additionally or alternatively use a different visual technique to present the receivability score. For example, the UI may present a rotating dial graphic (like an odometer or a volume knob) with textual markers such as "very bad," "not great," "good," "better," "excellent", etc. The antenna positioner circuitry 108 may then cause the dial graphic to rotate based on the current receivability score. As another example, the antenna positioner circuitry 108 may present an outline of the building 400 and a "heat map" where positions with higher receivability scores are assigned warmer colors than positions with lower receivability scores.

The view 704 is an example implementation of what the mobile display 310 may show when the user first begins a search. The view 704 provides the current receivability score, the lowest receivability score that was calculated since the search started, and the highest receivability score since the search started. However, because the search has just begun in this example, all three numbers are the same (e.g., 14). The view 704 also provides a recommendation for the user to move towards a candidate antenna position. In this example, the recommendation is displayed visually as an arrow that points from the current position of the mobile device 106 and towards the candidate antenna position. In other examples, the antenna positioner circuitry 108 uses a different visual to provide a recommendation to the user. The candidate antenna position is discussed further in connection with 10.

In some examples, the antenna positioner circuitry 108 can recommend the user change their elevation based on the receivability score and the altimeter circuitry 306. For example, the view 706 shows the lowest receivability score of the current search (e.g., 14), the current receivability score (e.g., 63), and the highest receivability score of the current search (e.g., 82). The view 706 also provides an arrow that points upwards (e.g., by walking up a flight of stairs). The direction of the arrow points upwards because the elevation data from the altimeter circuitry 306 indicates the current candidate antenna position is above the current position of the mobile device 106. In doing so, the antenna positioner circuitry 108 encourages the user to move to a position that is likely to have a higher receivability score.

As used above and herein, a "search" refers to a period where the user is actively determining where to place the antenna device 102. Accordingly, the antenna positioner circuitry 108 provides feedback to the user during a search by repeatedly updating the receivability score. A user may start or stop a search at any time and for any reason.

Figure 8:
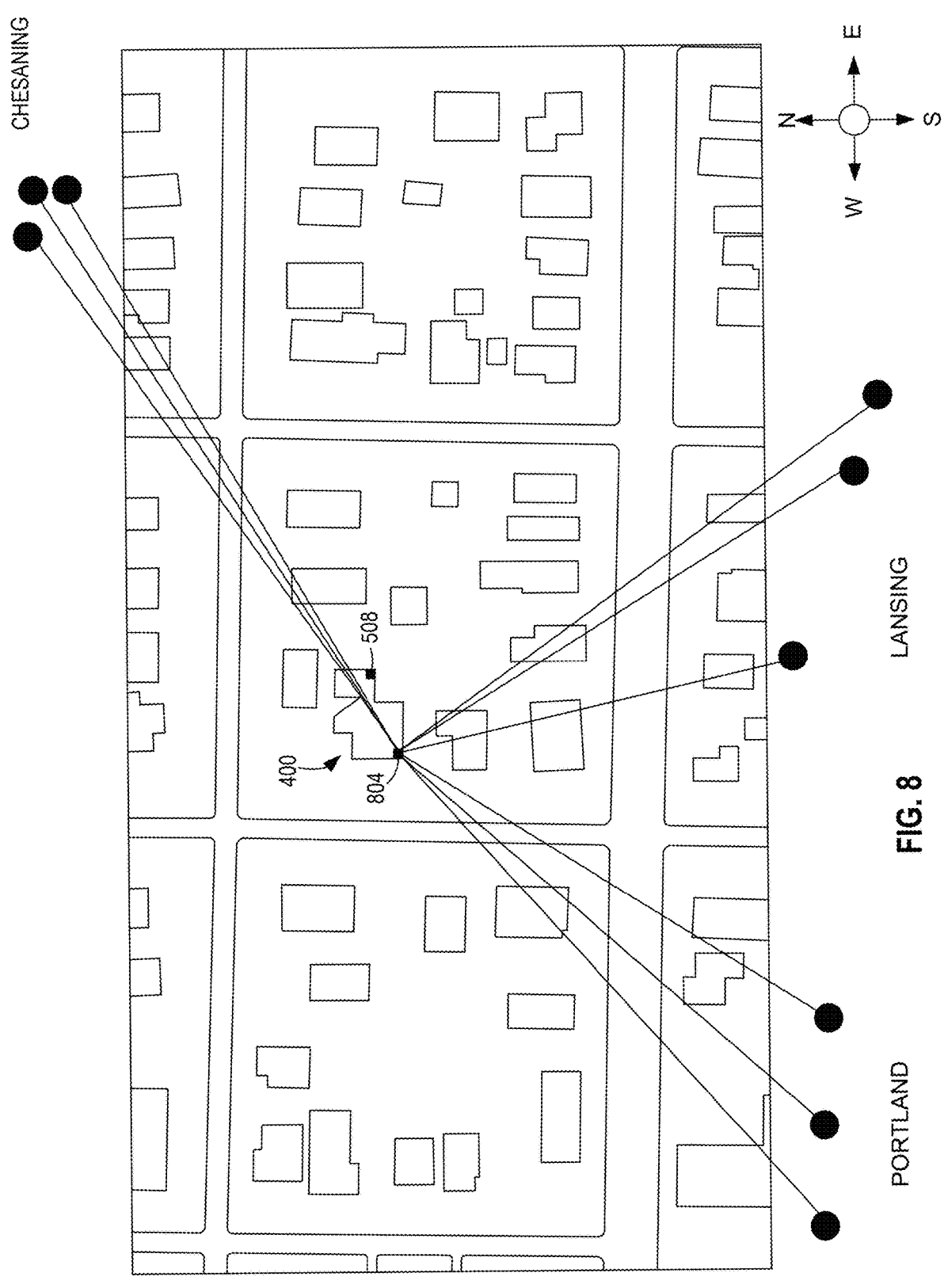
FIG. 8 is a map illustrating operations performed by the mobile device of FIG. 1 based on changes to the broadcast towers of FIG. 4.

FIG. 8 is a map illustrating operations performed by the mobile device of FIG. 1 based on changes to the broadcast towers of FIG. 4. FIG. 8 includes the building 400, the position 508, and the example position 804.

The antenna positioner circuitry 108 helps the user locate a position for the antenna device 102 based on the current status of multiple factors. Such factors include the number and location of broadcast towers 116, user preferences, etc. as described above. Thus, if the status of one or more of the factors changes, a new position within the building 100 may correspond to a better user experience than the previous position selected by the user.

In the example of FIG. 8, new broadcast towers 116 are constructed in Portland, Michigan after the user placed the antenna device 102 at position 508. In response to learning that the new broadcast towers 116 have been constructed, the antenna positioner circuitry 108 may prompt the user to initiate a new search for an antenna position. When calculating new receivability scores during the new search, a combination of duplicative content and/or user preferences may cause the antenna positioner circuitry 108 to prioritize the signal strength of the OTA streams from Portland over the signal strength of OTA streams from Chesaning. In such an example, the antenna positioner circuitry 108 causes the receivability score at position 804 to be higher than the score at position 508 (because position 804 is closer to Portland and Lansing than position 508), thereby prompting the user to move the antenna device 102.

In the example of FIG. 8, topological data available to the antenna positioner circuitry 108 indicates the geographic region around the building 400 is relatively flat. The antenna positioner circuitry 108 may obtain topological data from any source, including but not limited to external devices via the network 118.

In other examples, topological data indicates that the geographic region surrounding a building 100 has relatively large variation in elevation. In some examples, the elevation variation is an obstruction that causes exceptions to the general assertion that signal quality decreases as distance increases. For example, suppose a large hill or mountain existed between St. John's and Portland. In such a hypothetical, the antenna positioner circuitry 108 may predict that the geographic feature will block signals such that the signal strength of OTA streams from Portland will be lower than the signal strength of OTA streams from Chesaning, despite Portland being closer to St. John's than Chesaning. In turn the antenna positioner circuitry 108 may update the receivability scores a relatively small amount or choose to not prompt the user to conduct a new search because the new base stations in the hypothetical are unlikely to improve user experience regardless of where the antenna device 102 is positioned within the building 400.

More generally, the antenna positioner circuitry 108 can use topological data to assess the elevation change between the building 400 and any base station. The antenna positioner circuitry 108 can then factor the relative elevation changes corresponding to multiple broadcast towers when determining the receivability score.

Figure 9:
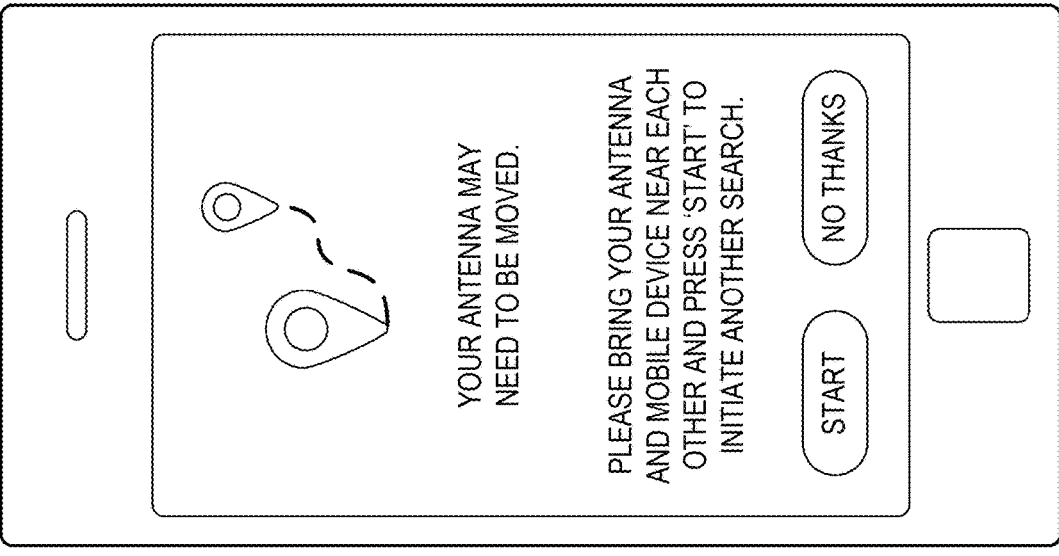
FIG. 9 is an additional illustrative example of information presented on the mobile display of FIG. 3 based on operations performed by the mobile device of FIG. 1.

FIG. 9 is an additional illustrative example of information presented on the mobile display 310 based on operations performed by the antenna positioner circuitry 108. FIG. 9 includes an example view 900.

The antenna positioner circuitry 108 may perform periodic checks to determine whether a new search or different antenna device 102 is likely to result in an improved user experience. The antenna positioner circuitry 108 can make the foregoing determination based on any number of factors.

Figure 13:
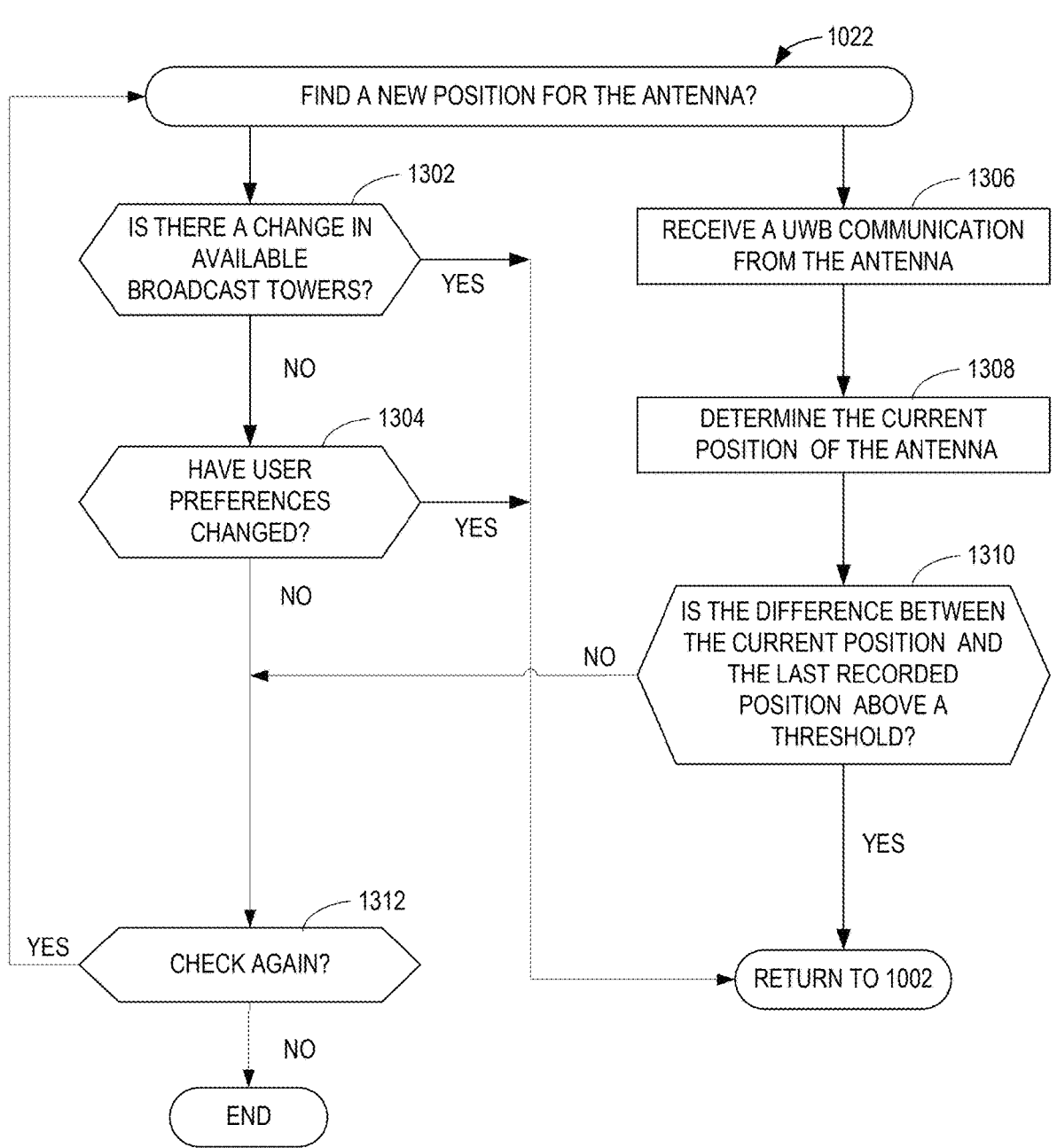
FIG. 13 is a flowchart representative of example machine-readable instructions and/or example operations that may be executed, instantiated, and/or performed to determine whether to find a new location for the antenna as discussed in FIG. 10.

Examples of such factors and subsequent operations performed by the antenna positioner circuitry 108 are discussed further in connection with FIG. 13.

When the antenna positioner circuitry 108 determines a new search is likely to result in an improved user experience, the antenna positioner circuitry 108 may cause the mobile display 310 the view 900 to prompt the user into initiating a new search. For example, in FIG. 8, the antenna positioner circuitry 108 may cause presentation of the view 900 to prompt the additional search that results in the user moving the antenna device 102 from position 504 to position 804.

The antenna positioner circuitry 108 may additionally or alternatively use any suitable technique to prompt the user into initiating a new search. Such techniques include but are not limited to sending a notification through the OS of the mobile device 106.

While an example manner of implementing the mobile device 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example antenna positioner circuitry 108, the example GPS control circuitry 302, the example UWB control circuitry 304, the example altimeter circuitry 306, the example display driver circuitry 308, the example mobile display 310, the example memory 312, and/or, more generally, the example mobile device 106 of FIG. 3, may be implemented by hardware alone or by hardware in combination with software and/or firmware. Thus, for example, any of the example antenna positioner circuitry 108, the example GPS control circuitry 302, the example UWB control circuitry 304, the example altimeter circuitry 306, the example display driver circuitry 308, the example mobile display 310, the example memory 312, and/or, more generally, the example mobile device 106, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example mobile device 106 of FIG. 3 may include one or more elements, processes, and/or devices in addition to, or instead of, those illustrated in FIG. 3, and/or may include more than one of any or all of the illustrated elements, processes and devices.

Flowchart(s) representative of example machine-readable instructions, which may be executed by programmable circuitry to implement and/or instantiate the mobile device 106 of FIG. 3 and/or representative of example operations which may be performed by programmable circuitry to implement and/or instantiate the mobile device 106 of FIG. 3, are shown in FIGS. 10-13. In examples where some or all of the functionality of the antenna positioner circuitry 108 is implemented by circuitry within the antenna device 102, the machine-readable instructions and/or operations described by FIGS. 10-13 may additionally or alternatively refer to the antenna device 102.

The machine-readable instructions may be one or more executable programs or portion(s) of one or more executable programs for execution by programmable circuitry such as the programmable circuitry 1412 shown in the example programmable circuitry platform 1400 discussed below in connection with FIG. 14 and/or may be one or more function (s) or portion(s) of functions to be performed by the example programmable circuitry (e.g., an FPGA) discussed below in connection with FIGS. 15 and/or 16. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 10-13, many other methods of implementing the example mobile device 106 may alternatively be used. For example, the order of execution of the blocks of the flowchart(s) may be changed, and/or some of the blocks described may be changed, eliminated, or combined. Additionally, or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-13 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 10:
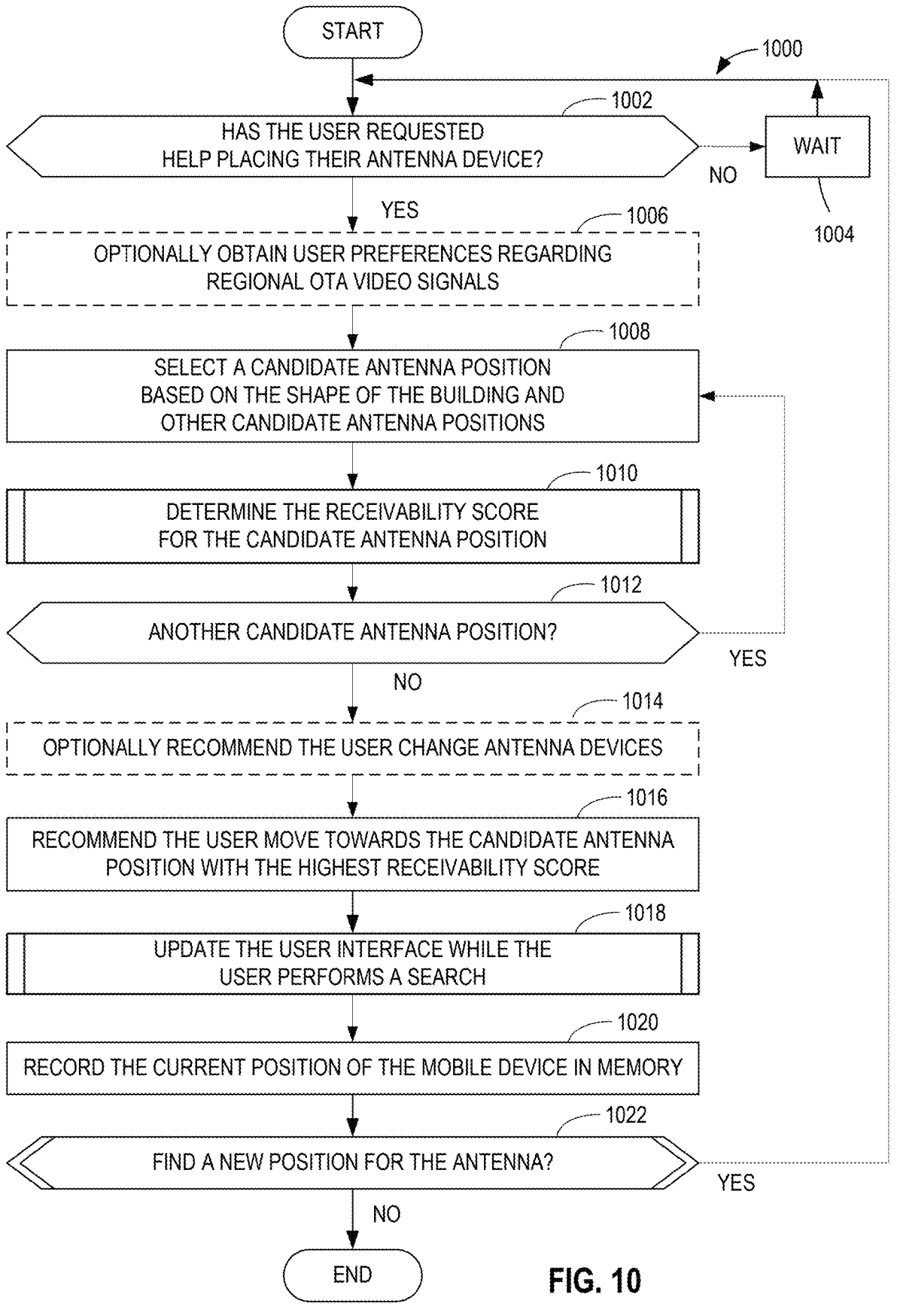
FIG. 10 is a flowchart representative of example machine-readable instructions and/or example operations that may be executed, instantiated, and/or performed by example programmable circuitry to implement the mobile device of FIG. 1.

FIG. 10 is a flowchart representative of example machine-readable instructions and/or example operations 1000 that may be executed, instantiated, and/or performed by programmable circuitry to assist a user in positioning the antenna device 102. The example machine-readable instructions and/or the example operations 1000 begin when the antenna positioner circuitry 108 determines whether the user has requested help placing the antenna device 102. (Block 1002). The user may indicate the they would like help placing the antenna device 102 for any reason, including but not limited to buying a new antenna, setting up a pre-existing new antenna in a new building, a decrease in the signal quality that occurs after the antenna is plugged into the display device 112, etc. In some examples, the antenna positioner circuitry 108 determines the user has requested help once the 'start' button is pressed in view 600 of FIG. 6 or 900 of FIG. 9. If the user has not requested help placing the antenna device 102 (Block 1002: No), the antenna positioner circuitry 108 waits an amount of time (Block 1004) before control returns to block 1002.

If the user has requested help placing the antenna device 102 (Block 1002: Yes), the antenna positioner circuitry 108 optionally obtains user preferences regarding regional OTA video signals. (Block 1006). For example, the antenna positioner circuitry 108 may compile a list of base stations less than a threshold distance from the building (e.g., all the broadcast towers 116 within one of the circles shown on the map of FIG. 4), determine which linear television channels (or other forms of media) are provided by the broadcast towers 116, and present the view 604 to determine which of the foregoing television channels the user considers to be part of their "favorites". In some examples, the antenna positioner circuitry 108 provides prompts on the UI that ask the user to choose between sets of channels whose corresponding base stations are in different directions relative to the building 100 (e.g., in view 604, the movie channel and home channel are provided by broadcast towers 116 located to the northeast of the building 400, but the food channel and sports channel are provided by broadcast towers 116 located to the south of the building 400).

In some examples, the antenna positioner circuitry 108 does not execute block 1006 on the current iteration of the flowchart of FIG. 10. The antenna positioner circuitry 108 may skip execution of block 1006 if user preferences have already been provided during a previous iteration, or if the user has previously indicated they do not have any specific preferences for one OTA stream over another. Additionally, or alternatively, the antenna positioner circuitry 108 does not execute block 1006 in response to a determination that the some or all of the regional broad cast towers 116 are located in approximately the same direction relative to the building 100. The antenna positioner circuitry 108 may make such a determination because, in general, the signal strengths of two OTA streams arriving from the same direction will change in the same manner (e.g., both increase or both decrease) as the user moves the antenna device 102 throughout the building 100. Thus, if a threshold percentage of the regional broadcast towers 116 are located in approximately the same direction from the building, then the antenna positioner circuitry 108 may not obtain user preferences because there is little to no need to prioritize the quality of one OTA stream over another.

In some examples, the amount of user preferences obtained at block 1006 changes over subsequent iterations of the flowchart of FIG. 10. For example, before the search of FIG. 5 that caused the user to move the antenna from position 504 to position 508, suppose the antenna positioner circuitry 108 prompted the user to select their favorite channels from the OTA streams transmitted from the broadcast towers 116 in Lansing and Chesaning. As a result, when additional broadcast towers 116 are constructed later in Portland as shown in the example FIG. 8, the antenna positioner circuitry 108 may only prompt the user to select favorite channels from the new OTA streams transmitted from Portland. As used above and herein, a "search" for a position to place the antenna device 102 refers to the execution of block 1018 of FIG. 10 and the corresponding actions performed by the user.

The antenna positioner circuitry 108 selects a candidate antenna position based on the shape of the building and other candidate antenna positions. (Block 1008). As used herein, a "candidate antenna position" refers to a position with a building 100 that the antenna positioner circuitry 108 considers when forming a recommendation to the user for placement of the antenna device 102. Accordingly, a candidate antenna position may be any position within the building 100.

The antenna positioner circuitry 108 may begin to form a recommendation by selecting candidate antenna positions that are along the perimeter of the building 100. An initial preference for the perimeter of the building exists because, in general, the signal strength of an OTA video signal is likely to decrease as it travels further inside a building and encounters additional obstacles (walls, furniture, etc.). In some examples, the antenna positioner circuitry 108 determines the shape of the building 100 may analyzing satellite imagery and/or maps. The antenna positioner circuitry 108 may obtain the satellite imagery by using the network interface circuitry 305 to communicate with an external device (e.g., a webserver that displays maps for navigation services).

The antenna positioner circuitry 108 also selects new candidate antenna positions based on the presence of any previous candidate antenna positions that have already been generated. Over multiple iterations of block 1008, the antenna positioner circuitry 108 may select candidate antenna positions that are relatively far away from one another (e.g., on opposite sides of the building) because, in general, the antenna positioner circuitry 108 seeks to consider as many different areas of the building 100 as possible when making an initial recommendation to the user. As an example, when analyzing the building 400 as shown in FIGS. 5 and 8, the antenna positioner circuitry 108 may select the position 504, a position in the northeast corner of the building 400, a building on the south wall of the building 400, a position on the west wall, etc. to approximately cover the perimeter of the building.

The antenna positioner circuitry 108 determines the receivability score for the currently selected candidate antenna position. (Block 1010). Block 1010 is discussed further in connection with FIG. 12.

The antenna positioner circuitry 108 considers whether to select another candidate antenna position. (Block 1012). In general, the antenna positioner circuitry 108 can increase the quality of its recommendation to the user as the number of candidate antenna positions increases. However, a designer or manufacturer of the antenna positioner circuitry 108 may want to limit the number of candidate antenna positions considered in order to reduce computational resource usage and/or decrease the time required to provide an initial recommendation to the user. In some examples, the antenna positioner circuitry 108 selects a threshold number of candidate antenna positions (e.g., repeats the loop of blocks 1008-1012 until a threshold number of iterations has been reached).

The antenna positioner circuitry 108 optionally recommends the user change antenna devices. (Block 1014). The antenna positioner circuitry 108 can implement block 1014 in response to a determination that the current antenna device 102 is not well suited for the current geographic region. The antenna positioner circuitry 108 can use any suitable technique to arrive at the foregoing determination. In the example of FIG. 10, the antenna positioner circuitry 108 recommends the user change antenna devices in response to a determination that none of the receivability scores calculated at block 1010 satisfy a threshold value. In a different example, the antenna positioner circuitry 108 may compare the range of the antenna device 102 to the locations of broadcast towers 116 closest to the building 100. If a threshold number of broadcast towers 116 are located outside or near the edge of the antenna's range, the antenna positioner circuitry 108 may execute block 1014. The antenna positioner circuitry 108 can cause the mobile display 310 to present view 604 of FIG. 6 when there is a recommendation for the user to make an antenna change.

In the examples where the antenna positioner circuitry 108 does recommend the user change antenna devices, the antenna positioner circuitry 108 may optionally suggest one or more specific antenna products for the user. The antenna positioner circuitry 108 may make the antenna product suggestion based on the ranges of various antenna products on the market (as listed on a data sheet, for example) and the locations of the broadcast towers 116 closest to the building 100. Additionally, or alternatively, the antenna positioner circuitry 108 makes the antenna product suggestion based on factors other than performance (e.g., cost, various contractual or business agreements to promote specific products, etc.).

The antenna positioner circuitry 108 recommends the user move towards the candidate antenna position with the highest receivability score. (Block 1016). To do so, the antenna positioner circuitry 108 sends instructions to the display driver circuitry 308 causing the UI displayed on the mobile display 310 to change. The antenna positioner circuitry 108 may use any suitable visual technique to guide the user to a candidate antenna position. In the examples of FIG. 7, the antenna positioner circuitry 108 uses arrows that change directions and corresponding icons. In another example, the antenna positioner circuitry 108 shows a path from the current position of the mobile device 106 to the candidate antenna position. The path may be overlaid onto a map of the building, onto a camera feed using augmented reality, etc. In other examples, a different visual technique is used. By making the recommendation of block 1016, the antenna positioner circuitry 108 helps reduce the amount of time user spends performing a search (e.g., moving throughout the building 100 while determining where to place the antenna device 102).

The antenna positioner circuitry 108 causes the UI on the mobile display 310 to update while the user performs a search. (Block 1018). In examples described herein, updating the UI may include repeatedly updating the receivability score and/or recommendation to the user. Block 1018 is discussed further in connection with FIG. 11.

After the user has completed their search, the antenna positioner circuitry 108 stores the current position of the mobile device in memory (Block 1020). The position data can be used for future reference (e.g., when executing block 1022) as a proxy to the position of the antenna device 102.

In the example of FIG. 10, the position data of block 1020 is three-dimensional data, where the 'x' and 'y' dimensional data is provided by the GPS control circuitry 302 and the 'z' dimensional data is provided by the altimeter circuitry 306. In other examples, position data may be implemented with a different number of dimensions and/or is provided by different components.

The antenna positioner circuitry 108 determines whether to find a new position for the antenna device 102. (Block 1022). The antenna positioner circuitry 108 makes the determination of block 1022 based on the change in status of one or more factors that were used to determine the current position of the antenna device 102. Example implementations of block 1022 are discussed further in connection with FIG. 13.

If the antenna positioner circuitry 108 determines a new position for the antenna device 102 should be found (Block 1022: Yes), the antenna positioner circuitry 108 prompts the user to initiate another search. For example, the antenna positioner circuitry 108 may cause mobile display 310 to present the view 900 of FIG. 9 or a similar notification. Control then returns to block 1002 where the antenna positioner circuitry 108 determines if the user has requested placing their antenna device 102. If the antenna positioner circuitry 108 determines user experience cannot be improved by moving the antenna device 102 again (Block 1022: No), the machine-readable instructions and/or operations 1000 end.

Figure 11:
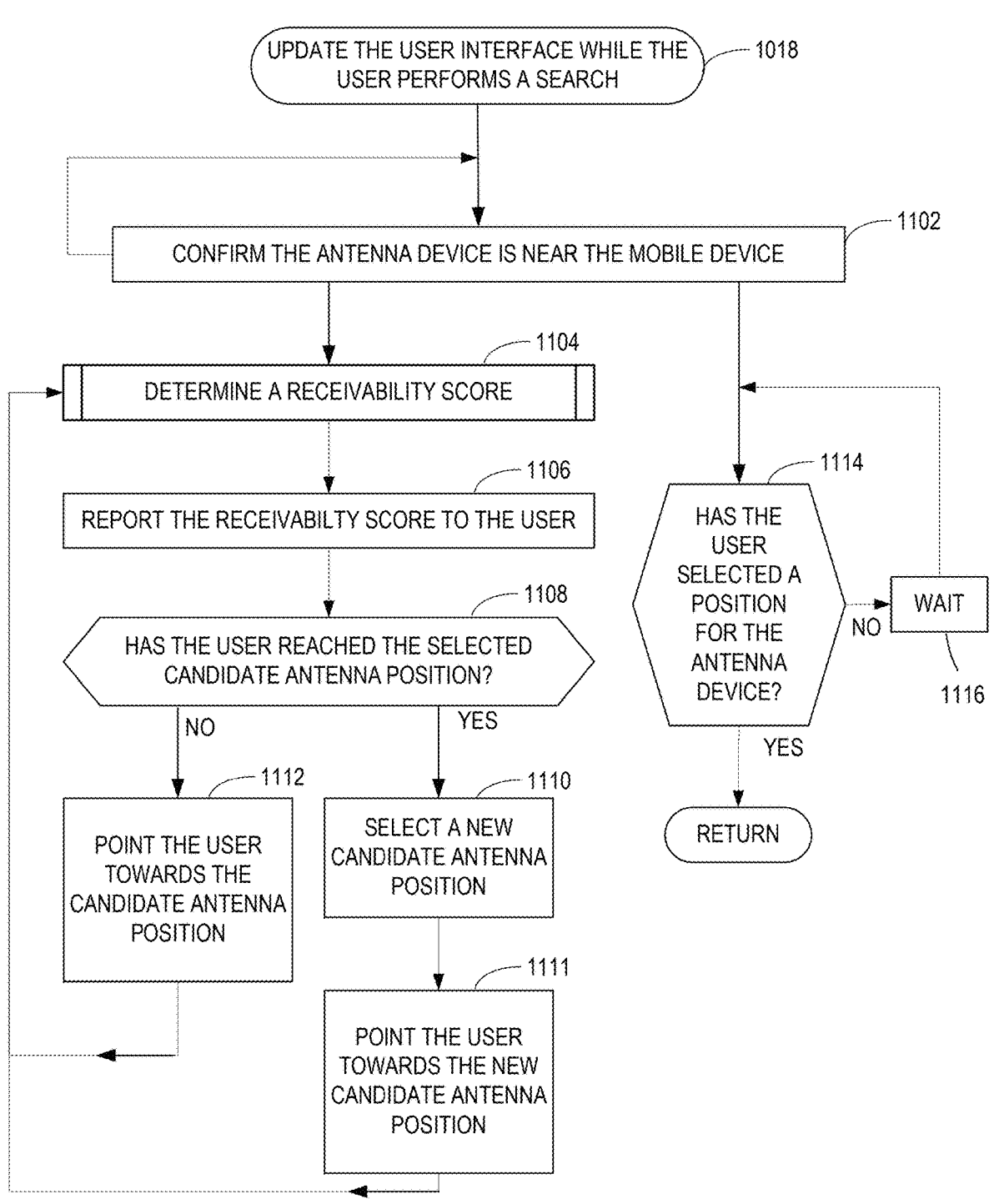
FIG. 11 is a flowchart representative of example machine-readable instructions and/or example operations that may be executed, instantiated, and/or performed to update the user interface as the user performs a search as discussed in FIG. 10.

FIG. 11 is a flowchart representative of example machine-readable instructions and/or example operations that may be executed, instantiated, and/or performed to update the user interface as the user performs a search as discussed in FIG. 10. In particular, the flowchart of FIG. 11 is an example implementation of block 1018 of FIG. 10.

Execution of block 1018 begins when the antenna positioner circuitry 108 confirms that the antenna device 102 is near the mobile device 106. (Block 1102). As used above and herein, the mobile device 106 and the antenna device 102 are "near", "close", and/or "in proximity" to one another if the distance between the antenna device 102 and the mobile device 106 is less than a threshold value. To determine the distance between the antenna device 102 and the mobile device 106, the UWB control circuitry 304 first sends and/or receives UWB communications with the antenna device 102. The antenna positioner circuitry 108 then performs any of the suitable techniques described above to process the data from the UWB control circuitry 304 and determine the distance.

The antenna positioner circuitry 108 repeatedly checks the antenna device 102 is near the mobile device 106 during the search. Accordingly, the antenna positioner circuitry 108 repeatedly executes block 1102 in parallel with execution of the blocks 1104-1112 loop and the blocks 1114-1116 loop. In some examples, the antenna positioner circuitry 108 continuously executes block 1102. In other examples, the antenna positioner circuitry 108 periodically executes block 1102 (e.g., the distance between devices is updated every n millisecond, where n is any positive number). Additionally, or alternatively, the antenna positioner circuitry 108 re-executes in block 1102 in response to a condition (e.g., the three-dimensional position of the mobile device 106 changing more than a threshold amount from a previous measurement).

If the distance between the antenna device 102 and the mobile device 106 exceeds the threshold value at any point, the antenna positioner circuitry 108 executes block 1102 by prompting the user to bring the devices closer together. The antenna positioner circuitry 108 may prompt the user by causing the mobile display 310 to present the view 702 of FIG. 7.

In parallel with the execution of block 1102, the antenna positioner circuitry 108 determines a receivability score. (Block 1104). The antenna positioner circuitry 108 determines receivability scores based on parameters including but not limited to the current three-dimensional position of the mobile device 106, the number, location, and performance characteristics of the broadcast towers 116 in the region, the content within OTA video signals received by the broadcast towers 116, topological data, and user preferences. In some examples, the antenna positioner circuitry 108 determines the receivability score based on one or more different parameters. Block 1104 is discussed further in connection with FIG. 12.

The antenna positioner circuitry 108 reports the receivability score to the user. (Block 1106). The antenna positioner circuitry 108 reports the receivability score by sending instructions to the display driver circuitry 308 that causes the UI presented on the mobile display 310 to update. In the example of FIG. 7, the antenna positioner circuitry 108 updates the UI by providing the current score, the lowest score of the search, and the highest score of the search as integers. In other examples, the antenna positioner circuitry 108 updates the UI in a different manner to report the receivability score (e.g., moving a needle on a rotating dial graphic, updating a heat map, etc.). Accordingly, in some examples, the antenna positioner circuitry 108 reports additional data (e.g., other receivability scores) to the user at block 1014. In such examples, the antenna positioner circuitry 108 obtains the additional data from the memory 312.

The antenna positioner circuitry 108 determines whether the user has reached the selected candidate antenna position. The antenna positioner circuitry 108 executes block 1106 by determining whether the distance between the current position of the mobile device 106 and the candidate antenna position is less than a threshold value.

The candidate antenna position may change over the course of a search. For example, the antenna positioner circuitry 108 determines a recommended antenna position at the beginning of the search (e.g., at block 1016 of FIG. 10) by selecting the candidate antenna position with the highest receivability score. However, once the user has reached the selected candidate antenna position (Block 1108: Yes), the antenna positioner circuitry 108 selects a new candidate antenna position. (Block 1110) The antenna positioner circuitry 108 makes the additional recommendation at block 1110 because the user is still conducting the search and therefore still determining where to place the antenna device 102. The antenna positioner circuitry 108 may select a new candidate antenna position using any suitable technique. For example, the antenna positioner circuitry 108 may re-execute blocks 1008-1012, may select a position the user has visited previously, etc.

The antenna positioner circuitry 108 points the user towards the new candidate antenna position. (Block 111). Similarly, if the user has not yet reached the existing candidate position (Block 1108: No), the antenna positioner circuitry 108 continues pointing the user towards the existing candidate antenna position. The antenna positioner circuitry 108 may use any visual technique to provide the recommendations of block 1111 and 1112 as described above.

After either block 1111 or block 1112, control returns to block 1104 where the antenna positioner circuitry 108 updates the receivability score. Like block 1102, the antenna positioner circuitry 108 may execute the loop of blocks 1104-1112 continuously, periodically, and/or in response to certain conditions. For example, to reduce computational resource usage, the antenna positioner circuitry 108 may skip recalculating the receivability score at block 1104 in response to a determination that the user has already visited the current position during the current search. In some examples, the value produced by a first iteration of block 1104 is referred to as an initial receivability score and the value produced by a subsequent iteration is referred to as an updated receivability score.

In parallel with block 1102 and the loop of blocks 1104-1112, the antenna positioner circuitry 108 determines whether the user has selected a position for the antenna device. (Block 1114). The antenna positioner circuitry 108 makes the determination of block 1114 in response to the user pressing a corresponding button within the UI (e.g., the user presses the 'stop' button in views 704 or 706), thereby ending the current search. The user may end the search at any time and for any reason. For example, the user may end the search if they feel they have found a position where there is both a sufficiently high receivability score and it is practicable to place the antenna device 102 for an extended period (e.g., there is a window or other flat surface nearby for antenna devices with the form factor shown in FIG. 1, a cable from the current position to the display device 112 will be unobtrusive, etc.). The user may or may not move throughout the entire building 100 during the current search. Accordingly, the user may or may not place the antenna device 102 at the position with the highest receivability score. However, by receiving feedback through the repeatedly updating receivability score, the user can quickly and easily balance the quality of the received OTA signals as a factor with other subjective considerations (e.g., practicability as described above). As such, a mobile device 106 and antenna device 102 implemented according to the teachings herein can improve user experience compared to the time consuming and tedious task of running a channel scan.

If the user has not selected a position for the antenna device 102 (Block 1114: No), the antenna positioner circuitry 108 waits for an amount of time (Block 1116) before control returns to block 1114. If the user has selected a position for the antenna device 102 (Block 1114: Yes), the current search has ended. At such time, control returns to block 1020 of FIG. 10.

Figure 12:
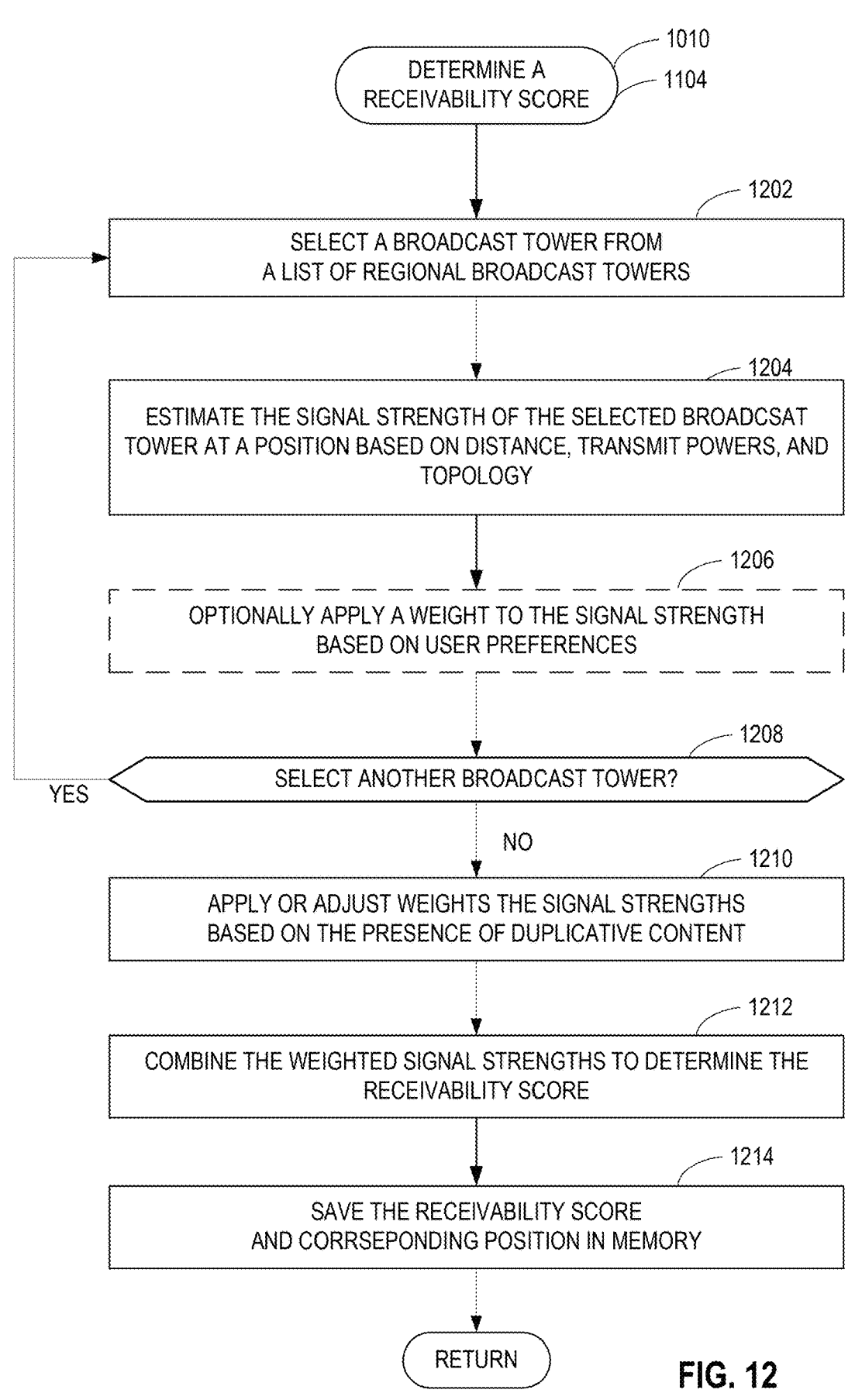
FIG. 12 is a flowchart representative of example machine-readable instructions and/or example operations that may be executed, instantiated, and/or performed to determine a receivability score as discussed in FIGS. 10 and 11.

FIG. 12 is a flowchart representative of example machine-readable instructions and/or example operations that may be executed, instantiated, and/or performed to determine a receivability score as discussed in FIG. 10. In particular, the flowchart of FIG. 12 is an example implementation of block 1010 of FIG. 10 and of block 1104 of FIG. 11.

The execution of block 1012 begins when the antenna positioner circuitry 108 selects a broadcast tower from a list of available broadcast towers 116. (Block 1202). The antenna positioner circuitry 108 may determine the list of regional broadcast towers from any source, including but not limited to external devices that are accessible via the network 118. For example, the antenna positioner circuitry 108 may cause the network interface circuitry 305 to access one or more webpages that provide the geographic locations of base stations transmitting OTA video signals. Accordingly, antenna positioner circuitry 108 can determine the list of broadcast towers by obtaining base station geographic data from one or more webpages, then removing any base stations that would not be receivable from the building 100 (e.g., the base stations whose distance from the building 100 exceed the range of the antenna device 102) and storing the remaining geographic base station data in the memory 312. The antenna positioner circuitry 108 can also store performance characteristics of the selected broadcast towers 116 (e.g., transmit power) in the memory 312 when said data is available. The antenna positioner circuitry 108 then picks one of the base stations from the list stored in the memory 312 to execute block 1202.

The antenna positioner circuitry 108 estimates the signal strength from the selected broadcast tower at a given location based on distance, transmit powers, and topology. (Block 1204). When executing block 1010, the position of block 1204 refers to the candidate antenna position selected at block 1008. When executing block 1104, the position of block 1204 refers to the current position of the mobile device 106.

Signal strength generally increases as: a) distance to the building 100 decreases, and b) as transmit power of the base station increases. Accordingly, the antenna positioner circuitry 108 may estimate and assign a numerical value to the signal strength (e.g., in decibels) based on the foregoing factors and relationships. However, large hills, mountains, or other geographic features between the selected base station and the building 100 may cause the signal strength to be lower than it otherwise without the presence of said features. As such, the antenna positioner circuitry 108 assesses the elevation change between the building 100 and the selected base station based on topological data, and, if needed, decreases the signal strength value proportionally.

The antenna positioner circuitry 108 optionally applies a weight to the signal strength based on user preferences. (Block 1206). As used herein, a weight refers to a numerical value that quantifies the importance of one OTA video signal relative to another. For example, when determining the receivability score, the antenna positioner circuitry 108 prioritizes maximizing the signal strength of a first OTA video stream over the signal strength of a second OTA video signal if the first OTA video signal has a greater weight value than second OTA video stream. Accordingly, the antenna positioner circuitry 108 assigns a large weight to the tower (thereby giving it a relatively high importance) when the user provides indication that they prefer the content transmitted from the selected broadcast tower. Similarly, the antenna positioner circuitry 108 assigns a small weight to the tower (thereby giving it a relatively low importance) when the user provides indication that they prefer the content transmitted from the selected broadcast tower.

The antenna positioner circuitry 108 determines whether to select another broadcast tower. (Block 1208). The antenna positioner circuitry 108 continues to select broadcast towers until all of the towers on the list of block 1202 have been selected. If the antenna positioner circuitry 108 does determine select another tower (Block 1208: Yes), control returns to block 1202 and another signal strength is eventually computed for another broadcast tower.

Alternatively, if the antenna positioner circuitry 108 does not select another tower (Block 1208: No), the antenna positioner circuitry 108 applies or adjusts weights to the signal strengths based on duplicative content. (Block 1210). For example, suppose two broadcast towers 116 from the list in memory 312 are located in opposite directions relative to the building 100 and transmit the same or substantially similar content (e.g., the same linear television channel) in the OTA streams. In such examples, the antenna positioner circuitry 108 applies or adjusts weights at block 1210 such that one of the broadcast signals is more prioritized and the other broadcast signal is less prioritized. In doing so, the antenna positioner circuitry 108 can determine a receivability score without needing to balance the signal strengths of the two OTA streams (as one is not needed). As used above and herein, applying a weight refers to multiplying a weight value with a corresponding signal strength value. In some examples, a weight may be referred to as a scaling factor.

The antenna positioner circuitry 108 determines which broadcast tower to prioritize more and which broadcast tower to prioritize less based on the weights and signal strengths of the other broadcast towers. For example, suppose a first broadcast tower from the list in memory 312 is located north of the building 100 and a second broadcast tower from the list, transmitting duplicative content, is located south of the building 100. If the user has indicated they prefer OTA streams that happen to be located northeast of the building 100, then the antenna positioner circuitry 108 increases the weight corresponding to the broadcast tower north of the building 100. The antenna positioner circuitry 108 may additionally or alternatively decrease the weight corresponding to the broadcast tower south of the building 100 in such examples.

The antenna positioner circuitry 108 combines the weighted signal strengths to determine the receivability score. (Block 1212). In some examples, the antenna positioner circuitry 108 performs the combination operations by averaging the products of the signal strength values and corresponding weight values. In other examples, the antenna positioner circuitry 108 performs different operations to combine the multiple products into a single numerical value. The antenna positioner circuitry 108 may also perform one or more rounding, normalizing, or similar data processing operations to the corresponding numerical value at block 1212. Such operations are performed so that the receivability score (which is the output of said operations) can be compared accurately against other receivability scores, used to update the UI on the mobile display 310, etc.

The antenna positioner circuitry 108 saves the receivability score and corresponding position in the memory 312. (Block 1214). In some examples, the antenna positioner circuitry 108 saves the foregoing data in response to a condition occurring. Such conditions may include the user ending the search by selecting a position for the antenna device 102, the receivability score determined in the current iteration of block 1212 being the highest or lowest value determined during the current search, etc. In some examples, the antenna positioner circuitry 108 saves receivability scores and corresponding position data periodically so that the UI can show a graphic based on the history of the current search (e.g., presenting the receivability scores as a dynamic graph or heat map that changes over time).

The antenna positioner circuitry 108 may choose to delete or over-write old receivability scores from memory 312 based on the technique for how the receivability scores were saved. For example, if a particular score was saved in memory because it is the highest score of the current search, the antenna positioner circuitry 108 may wait to delete said value until: a) a new score is calculated that is higher than the score already saved in memory, or b) the current search ends. As an additional example, if receivability scores are saved periodically (e.g., a new score is saved once every x milliseconds), the antenna positioner circuitry 108 may also delete the oldest value currently stored in memory 312 whenever a new score is saved. By doing so, the antenna positioner circuitry 108 can maintain a First In First Out (FIFO) buffer and enforce a limit on the amount of data used in memory 312 for determining antenna position. Execution of block 1012 returns to block 1014 after the antenna positioner circuitry 108 implements block 1214 and implements any corresponding deletion over overwriting operations.

FIG. 13 is a flowchart representative of example machine-readable instructions and/or example operations that may be executed, instantiated, and/or performed to determine whether to find a new location for the antenna as discussed in FIG. 10. In particular, the flowchart of FIG. 13 is a first example implementation of block 1022 of FIG. 10.

Execution of block 1022 begins when the antenna positioner circuitry 108 determines whether there is a change in available broadcast towers. (Block 1302). The antenna positioner circuitry 108 implements block 1302 by periodically checking the data sources that were used to initially populate the list of available broadcast towers for changes. For example, if the original data sources for the broadcast location and performance data was a series of webpages, the antenna positioner circuitry 108 can cause the network interface circuitry 305 to access the same webpages at a later time. The antenna positioner circuitry 108 then compares the current webpage results (e.g., data describing the locations and performance of the base stations) with the results that are stored in memory. If there is a change in available broadcast towers (Block 1302: Yes), the receivability scores can be updated to reflect the presence of new OTA streams that may be received antenna device 102. Accordingly, control returns to block 1002 of FIG. 10 in such examples.

If there is no change in the available broadcast towers (Block 1302: No), the antenna positioner circuitry 108 determines whether user preferences have changed. (Block 1304). A user may change their preferences at any time and for any reason. In some examples, the antenna positioner circuitry 108 determines user preferences have changed by communicating over the network 118 (e.g., to the STB 110 or a head end device) to identify any additions, removals, or changes to user profiles associated with the display device 112.

If user preferences have changed (Block 1304: Yes), the weights described in FIG. 10 can be adjusted to provide receivability scores that reflect the user's new preferences. Accordingly, control returns to block 1002 of FIG. 10 in such examples. Alternatively, if the user preferences have not changed (Block 1304: No), control proceeds to block 1312.

At any point before, during, or after execution of blocks 1302-1304, the antenna positioner circuitry 108 may receive a UWB communication from the antenna. (Block 1306). The antenna positioner circuitry 108 can receive such a communication when the antenna device 102 and the mobile device 106 are within the range of UWB communication from one another. In some examples, the range of UWB communication is approximately fifty meters. More generally, the range of UWB communication may depend on the exact frequency used in the UWB range, the power of the devices communicating, and the desired accuracy of UWB positioning operations.

The antenna positioner circuitry 108 determines the current position of the antenna device 102. (Block 1308). The antenna positioner circuitry 108 may use any suitable UWB positioning technique to determine the current position of the antenna device as discussed above.

The antenna positioner circuitry 108 determines whether the distance between the current position of the antenna device 102 and its last position (as recorded in memory 312 at block 1024) exceeds a threshold. (Block 1310). If the distance between the two positions exceeds the threshold (Block 1310: Yes), the antenna device 102 has moved since the last search. In some examples, the movement is unintentional (e.g., the antenna device 102 fell off a shelf or a ledge, pushed by a nearby object, etc.). Accordingly, in such examples, control returns to block 1002 in such examples so that the antenna positioner circuitry 108 can determine if the user wishes to conduct an additional search in view of the moved antenna device.

If the distance between the two positions does not exceed the threshold (Block 1310: No), or if user preferences have not changed (Block: 1304: No), the antenna positioner circuitry 108 determines whether to check again regarding the need for a new antenna position. (Block 1312). In some examples, the antenna positioner circuitry 108 may repeatedly check for the need to move the antenna as long as the mobile device is powered on, and/or as long as the OS of the mobile device 106 permits the antenna positioner circuitry 108 to continue performing operations. If the antenna positioner circuitry 108 decides to check again (Block 1312: Yes), control returns to the beginning of FIG. 13 where one or more of block 1302 and block 1306 are implemented. If the antenna positioner circuitry 108 decides not to check again (Block 1312: No), the machine-readable instructions and/or operations 1000 end.

In the example of FIG. 13, block 1304 is shown implemented in series after block 1302, and blocks 1306-1310 are shown as implemented in parallel with blocks 1302-1304. In other examples, block 1302, block 1304, and blocks 1306-1310 may be implemented in a different order. Additionally, or alternatively, the antenna positioner circuitry 108 does not perform one or more of the foregoing blocks, or performs different subsets of the foregoing blocks over subsequent iterations of FIG. 13.

Figure 14:
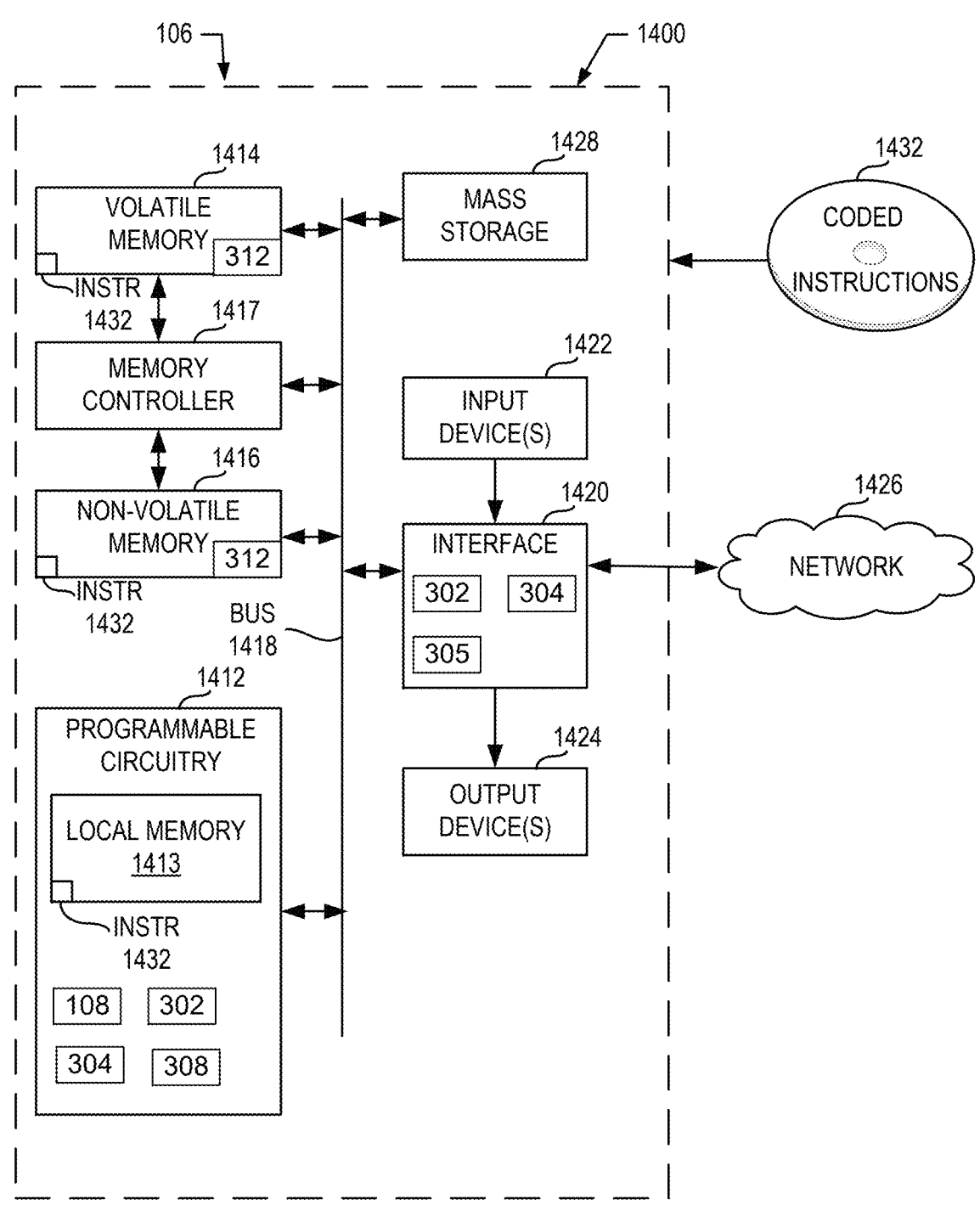
FIG. 14 is a block diagram of an example processing platform including programmable circuitry structured to execute, instantiate, and/or perform the example machine-readable instructions and/or perform the example operations of FIGS. 10-13 to implement the mobile device 106 of FIG. 3.

FIG. 14 is a block diagram of an example programmable circuitry platform 1400 structured to execute and/or instantiate the example machine-readable instructions and/or the example operations of FIGS. 10-13 to implement the mobile device 106 of FIG. 3. The programmable circuitry platform 1400 can be, for example, a mobile device (e.g., a cell phone, a smart phone, a tablet such as an iPad™), a wearable device, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/or microcontrollers from any desired family or manufacturer. The programmable circuitry 1412 may be implemented by one or more semiconductor based (e.g., silicon based) devices. In this example, the programmable circuitry 1412 implements the antenna positioner circuitry 108, the GPS control circuitry 302, the UWB control circuitry 304, and the display driver circuitry 308.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. In the illustrated example, the memory controller 1417 grants access to the main memory 1414, 1416. In some examples, the memory controller 1417 may be implemented by one or more integrated circuits, logic circuits, microcontrollers from any desired family or manufacturer, or any other type of circuitry to manage the flow of data going to and from the main memory 1414, 1416. In this example, the main memory 1414, 1416 implements the memory 312.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 1420 implements part of the GPS control circuitry 302, part of the UWB control circuitry 304, and the network interface circuitry 305.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1432, which may be implemented by the machine-readable instructions of FIGS. 10-13, may be stored in the mass storage device 1428, in the volatile memory 1414, in the non-volatile memory 1416, and/or on at least one non-transitory computer readable storage medium such as a CD or DVD which may be removable.

Figure 15:
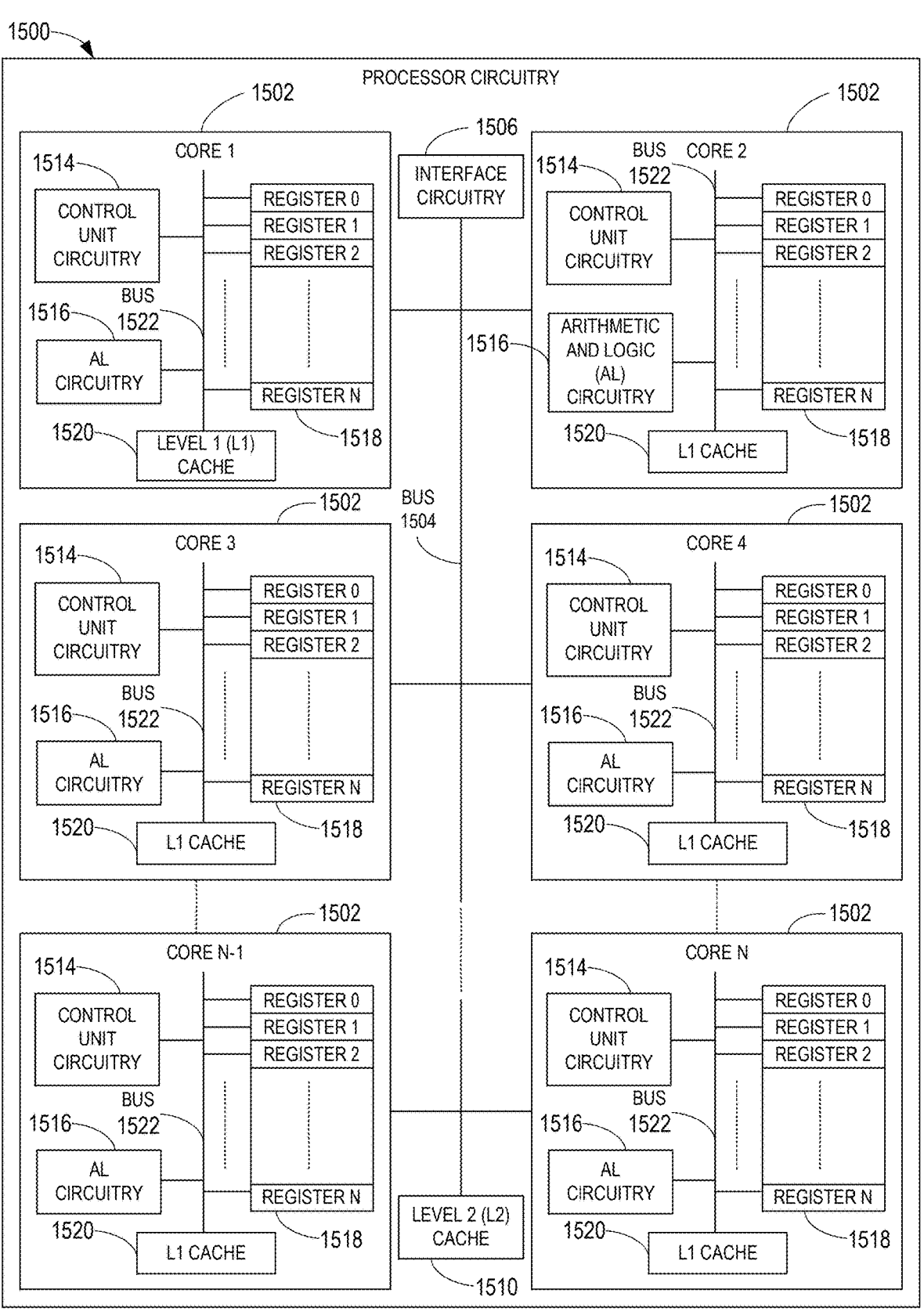
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general-purpose microprocessor (e.g., general-purpose microprocessor circuitry). The microprocessor 1500 executes some or all of the machine-readable instructions of the flowcharts of FIGS. 10-13 to effectively instantiate the circuitry of FIG. 2 as logic circuits to perform operations corresponding to those machine-readable instructions. In some such examples, the circuitry of FIG. 3 is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine-readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine-readable instructions and/or operations represented by the flowcharts of FIGS. 10-13.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally, or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer-based operations. In other examples, the AL circuitry 1516 also performs floating-point operations. In yet other examples, the AL circuitry 1516 may include first AL circuitry that performs integer-based operations and second AL circuitry that performs floating-point operations. In some examples, the AL circuitry 1516 may be referred to as an Arithmetic Logic Unit (ALU).

The registers 1518 are semiconductor-based structures to store data and/or instructions such as results of one or more of the operations performed by the AL circuitry 1516 of the corresponding core 1502. For example, the registers 1518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure, such as by being distributed throughout the core 1502 to shorten access time. The second bus 1522 may be implemented by at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages.

The microprocessor 1500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1500, in the same chip package as the microprocessor 1500 and/or in one or more separate packages from the microprocessor 1500.

Figure 16:
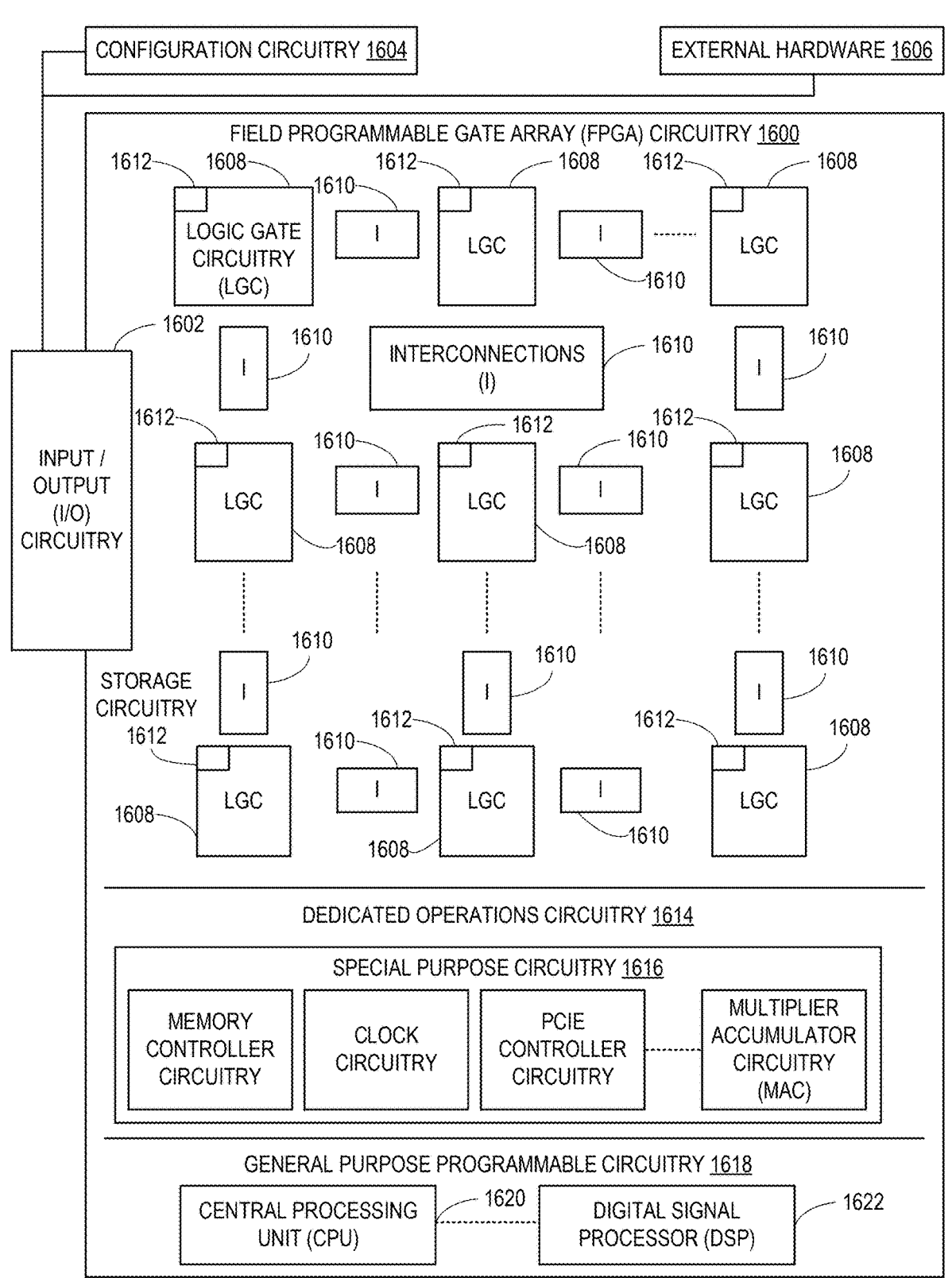
FIG. 16 is a block diagram of another example implementation of the programmable circuitry of FIG. 14.

FIG. 16 is a block diagram of another example implementation of the programmable circuitry 1412 of FIG. 14. In this example, the programmable circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine-readable instructions. However, once configured, the FPGA circuitry 1600 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine-readable instructions represented by the flowchart(s) of FIGS. 10-13 but whose interconnections and logic circuitry are fixed once fabricated), the FPGA circuitry 1600 of the example of FIG. 16 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 10-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 10-13. As such, the FPGA circuitry 1600 may be configured and/or structured to effectively instantiate some or all of the operations/functions corresponding to the machine-readable instructions of the flowchart(s) of FIGS. 10-13 as dedicated logic circuits to perform the operations/functions corresponding to those software instructions in a dedicated manner analogous to an ASIC. Therefore, the FPGA circuitry 1600 may perform the operations/functions corresponding to the some or all of the machine-readable instructions of FIGS. 10-13 faster than the general-purpose microprocessor can execute the same.

In the example of FIG. 16, the FPGA circuitry 1600 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain a binary file, which may be implemented by a bit stream, data, and/or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine-readable instructions of FIGS. 10-13 and/or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the programmable circuitry 1412 of FIG. 14, many other approaches are contemplated. For example, FPGA circuitry may include an on-board CPU, such as one or more of the example CPU 1620 of FIG. 15. Therefore, the programmable circuitry 1412 of FIG. 14 may additionally be implemented by combining at least the example microprocessor 1500 of FIG. 15 and the example FPGA circuitry 1600 of FIG. 16. In some such hybrid examples, one or more cores 1502 of FIG. 15 may execute a first portion of the machine-readable instructions represented by the flowchart(s) of FIGS. 10-13 to perform first operation(s)/function(s), the FPGA circuitry 1600 of FIG. 16 may be configured and/or structured to perform second operation(s)/function(s) corresponding to a second portion of the machine-readable instructions represented by the flowcharts of FIGS. 10-13, and/or an ASIC may be configured and/or structured to perform third operation(s)/function(s) corresponding to a third portion of the machine-readable instructions represented by the flowcharts of FIGS. 10-13.

It should be understood that some or all of the circuitry of FIG. 3 may, thus, be instantiated at the same or different times. For example, the same and/or different portion(s) of the microprocessor 1500 of FIG. 15 may be programmed to execute portion(s) of machine-readable instructions at the same and/or different times. In some examples, same and/or different portion(s) of the FPGA circuitry 1600 of FIG. 16 may be configured and/or structured to perform operations/ functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 1500 of FIG. 15 may execute machine-readable instructions in one or more threads executing concurrently and/or in series. In some examples, the FPGA circuitry 1600 of FIG. 16 may be configured and/or structured to carry out operations/functions concurrently and/or in series. Moreover, in some examples, some or all of the circuitry of FIG. 3 may be implemented within one or more virtual machines and/or containers executing on the microprocessor 1500 of FIG. 15.

In some examples, the programmable circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the programmable circuitry 1412 of FIG. 14, which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

Figure 17:
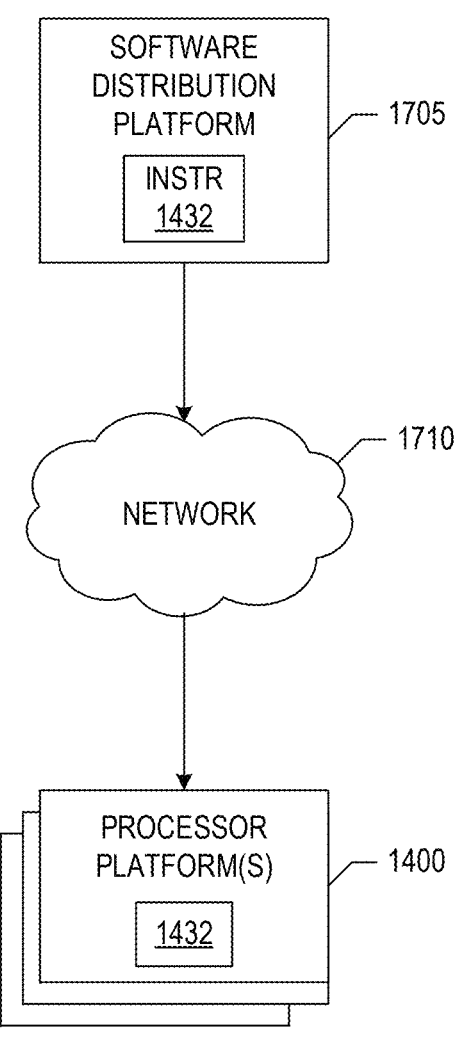
FIG. 17 is a block diagram of an example software/firmware/instructions distribution platform (e.g., one or more servers) to distribute software, instructions, and/or firmware (e.g., corresponding to the example machine-readable instructions of FIGS. 10-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine-readable instructions 1432 of FIG. 14 to other hardware devices (e.g., hardware devices owned and/ or operated by third parties from the owner and/or operator of the software distribution platform) is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine-readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine-readable instructions 1432, which may correspond to the example machine-readable instructions of FIGS. 10-13, as described above. The one or more servers of the example software distribution platform 1705 are in communication with an example network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1432 from the software distribution platform 1705. For example, the software, which may correspond to the example machine-readable instructions of FIGS. 10-13, may be downloaded to the example programmable circuitry platform 1400, which is to execute the machine-readable instructions 1432 to implement the mobile device 106. In some examples, one or more servers of the software distribution platform 1705 periodically offer, transmit, and/or force updates to the software (e.g., the example machine-readable instructions 1432 of FIG. 14) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that provide granular feedback to a user for antenna placement without having to run a channel scan or connect the antenna to a ten-foot display. Disclosed systems, apparatus, articles of manufacture, and methods improve the efficiency of using a computing device by confirming the antenna device and a mobile device are in close proximity to one another, by calculating a receivability score based on one or more of: the three-dimensional coordinates of the mobile device, the number, location, and performance of available base stations, the content of receivable OTA signals, topological data, and user preferences, by presenting the receivability score to a user through a UI on a mobile display, and by repeatedly updating the receivability score as the user moves throughout a building. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to position antennas are disclosed herein. Further examples and combinations thereof include the following.

Example 1 includes a mobile device comprising memory, machine-readable instructions, and programmable circuitry to at least one of instantiate or execute the machine-readable instructions to determine a receivability score based on estimated signal strengths of one or more broadcast signals at a first position, recommend a user place an antenna device at the first position, receive an ultra-wide band (UWB) communication from the antenna device, determine the antenna device is located at a second position based on the UWB communication, determine a receivability score based on estimated signal strengths at the second position, and report the receivability score to the user.

Example 2 includes the mobile device of example 1, wherein the first position and the second position are within a same building, and the programmable circuitry is to recommend the first position before the user begins a search to place the antenna device, and repeatedly update the receivability score and report the updated receivability score as the user moves throughout the building during the search.

Example 3 includes the mobile device of example 1, wherein to recommend the first position, the programmable circuitry is to determine a set of receivability scores corresponding to a set of positions within a building, the set of positions including the first position, determine the receivability score corresponding to the first position is the highest within the set, and provide a visual that points the user towards the first position.

Example 4 includes the mobile device of example 1, wherein to determine the receivability score, the programmable circuitry is to assign weights to the one or more broadcast signals based on user preference, adjust weights to the one or more broadcast signals based on duplicative content, and combine the weighted signals strengths to form the receivability score.

Example 5 includes the mobile device of example 1, wherein the one or more broadcast signals are transmitted by broadcast towers, and the programmable circuitry is to estimate the signal strengths based on one or more of distances between a current position of the mobile device and the broadcast towers, performance characteristics of the broadcast towers, and obstructions between the current position and the broadcast towers.

Example 6 includes the mobile device of example 5, wherein the programmable circuitry is to determine the distances between the current position of the mobile device and the broadcast towers using Global Positioning System (GPS) data.

Example 7 includes the mobile device of example 6, wherein the programmable circuitry is to determine the obstructions based on topological data.

Example 8 includes the mobile device of example 1, wherein the programmable circuitry is to maintain a list of broadcast towers that transmit broadcast signals receivable by the antenna device, and prompt, in response to a change of broadcast towers on the list, the user to move the antenna device.

Example 9 includes the mobile device of example 1, wherein the UWB communication is a first UWB communication, the programmable circuitry is to determine, based on a second UWB communication, the antenna device has moved from the second position to a third position, and prompt, based on a determination that a distance between the second position and the third position exceeds a threshold, the user to move the antenna device.

Example 10 includes the mobile device of example 9, wherein the programmable circuitry is to determine the distance between the second position and the third position after the user has selected the second position for the antenna device.

Example 11 includes the mobile device of example 1, wherein the antenna device is a first antenna device, and the programmable circuitry is to recommend, based on one or more receivability scores, that the user obtain a second antenna device, the second antenna device predicted to receive one or more broadcast signals with higher signal strength than the first antenna device.

Example 12 includes a non-transitory machine-readable storage medium comprising instructions to cause programmable circuitry to at least determine a receivability score based on estimated signal strengths of one or more broadcast signals at a first position, recommend a user place an antenna device at the first position, receive an ultra-wide band (UWB) communication from the antenna device, determine the antenna device is located at a second position based on the UWB communication, determine a receivability score based on estimated signal strengths at the second position, and report the receivability score to the user.

Example 13 includes the non-transitory machine-readable storage medium of example 12, wherein the first position and the second position are within a same building, and the programmable circuitry is to recommend the first position before the user begins a search to place the antenna device, and repeatedly update the receivability score and report the updated receivability score as the user moves throughout the building during the search.

Example 14 includes the non-transitory machine-readable storage medium of example 12, wherein to recommend the first position, the programmable circuitry is to determine a set of receivability scores corresponding to a set of positions within a building, the set of positions including the first position, determine the receivability score corresponding to the first position is the highest within the set, and provide a visual that points the user towards the first position.

Example 15 includes the non-transitory machine-readable storage medium of example 12, wherein to determine the receivability score the programmable circuitry is to assign weights to the one or more broadcast signals based on user preference, adjust weights to the one or more broadcast signals based on duplicative content, and combine the weighted signals strengths to form the receivability score.

Example 16 includes the non-transitory machine-readable storage medium of example 12, wherein the one or more broadcast signals are transmitted by broadcast towers, and the programmable circuitry is to estimate the signal strengths based on one or more of distances between a current position of a mobile device and the broadcast towers, performance characteristics of the broadcast towers, and obstructions between the current position and the broadcast towers.

Example 17 includes the non-transitory machine-readable storage medium of example 12, wherein the programmable circuitry is to maintain a list of broadcast towers that transmit broadcast signals receivable by the antenna device, and prompt, in response to a change of broadcast towers on the list, the user to move the antenna device.

Example 18 includes the non-transitory machine-readable storage medium of example 12, wherein the antenna device is a first antenna device, and the programmable circuitry is to recommend, based on one or more receivability scores, that the user obtain a second antenna device, the second antenna device predicted to receive one or more broadcast signals with higher signal strength than the first antenna device.

Example 19 includes a system comprising an antenna device to transmit an ultra-wide band (UWB) communication, and a mobile device comprising memory, machine-readable instructions, and programmable circuitry to at least one of instantiate or execute the machine-readable instructions to determine a receivability score based on estimated signal strengths of one or more broadcast signals at a first position, recommend a user place an antenna device at the first position, determine the antenna device is located at a second position based on the UWB communication, determine a receivability score based on estimated signal strengths at the second position, and report the receivability score to a user.

Example 20 includes the system of example 19, wherein the system further includes a display device to perform, when connected to the antenna device, a channel scan, and the mobile device is to recommend the first position and report the receivability score to the user while the antenna device is disconnected from the display device. The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A mobile device comprising:

memory;

machine-readable instructions; and programmable circuitry to at least one of instantiate or execute the machine-readable instructions to:

estimate signal strengths of one or more broadcast signals at a first position;

assign weights to the one or more broadcast signals based on user preference;

adjust weights to the one or more broadcast signals based on duplicative content;

combine the weighted signals strengths to form a receivability score;

recommend a user place an antenna device at the first position based on the receivability score;

receive an ultra-wide band (UWB) communication from the antenna device;

determine the antenna device is located at a second position based on the UWB communication;

update the receivability score based on estimated signal strengths at the second position; and report the receivability score to the user.

2. The mobile device of claim 1, wherein:

the first position and the second position are within a same building; and the programmable circuitry is to:

recommend the first position before the user begins a search to place the antenna device; and repeatedly update the receivability score and report the updated receivability score as the user moves throughout the building during the search.

3. The mobile device of claim 1, wherein to recommend the first position, the programmable circuitry is to:

determine a set of receivability scores corresponding to a set of positions within a building, the set of positions including the first position;

determine the receivability score corresponding to the first position is the highest within the set; and provide a visual that points the user towards the first position.

4. The mobile device of claim 1, wherein:

the one or more broadcast signals are transmitted by broadcast towers; and the programmable circuitry is to estimate the signal strengths based on one or more of:

distances between a current position of the mobile device and the broadcast towers;

performance characteristics of the broadcast towers; and obstructions between the current position and the broadcast towers.

5. The mobile device of claim 4, wherein the programmable circuitry is to determine the distances between the current position of the mobile device and the broadcast towers using Global Positioning System (GPS) data.

6. The mobile device of claim 4, wherein the programmable circuitry is to determine the obstructions based on topological data.

7. The mobile device of claim 1, wherein the programmable circuitry is to:

maintain a list of broadcast towers that transmit broadcast signals receivable by the antenna device; and prompt, in response to a change of broadcast towers on the list, the user to move the antenna device.

8. The mobile device of claim 1, wherein:

the UWB communication is a first UWB communication;

the programmable circuitry is to:

determine, based on a second UWB communication, the antenna device has moved from the second position to a third position; and prompt, based on a determination that a distance between the second position and the third position exceeds a threshold, the user to move the antenna device.

9. The mobile device of claim 8, wherein the programmable circuitry is to determine the distance between the second position and the third position after the user has selected the second position for the antenna device.

10. The mobile device of claim 1, wherein:

the antenna device is a first antenna device; and the programmable circuitry is to recommend, based on one or more receivability scores, that the user obtain a second antenna device, the second antenna device predicted to receive one or more broadcast signals with higher signal strength than the first antenna device.

11. A non-transitory machine-readable storage medium comprising instructions to cause programmable circuitry to at least:

determine a receivability score based on estimated signal strengths of one or more broadcast signals at a first position;

recommend a user place an antenna device at the first position based on the receivability score;

receive a first ultra-wide band (UWB) communication from the antenna device;

determine the antenna device is located at a second position based on the first UWB communication;

update the receivability score based on estimated signal strengths at the second position;

report the receivability score to the user;

after the user has selected the second position for the antenna device, determine, based on a second UWB communication, the antenna device has moved from the second position to a third position; and prompt, based on a determination that a distance between the second position and the third position exceeds a threshold, the user to move the antenna device.

12. The non-transitory machine-readable storage medium of claim 11, wherein:

the first position and the second position are within a same building; and the programmable circuitry is to:

recommend the first position before the user begins a search to place the antenna device; and repeatedly update the receivability score and report the updated receivability score as the user moves throughout the building during the search.

13. The non-transitory machine-readable storage medium of claim 11, wherein to recommend the first position, the programmable circuitry is to:

determine a set of receivability scores corresponding to a set of positions within a building, the set of positions including the first position;

determine the receivability score corresponding to the first position is the highest within the set; and provide a visual that points the user towards the first position.

14. The non-transitory machine-readable storage medium of claim 11, wherein to determine the receivability score the programmable circuitry is to:

assign weights to the one or more broadcast signals based on user preference;

adjust weights to the one or more broadcast signals based on duplicative content; and combine the weighted signals strengths to form the receivability score.

15. The non-transitory machine-readable storage medium of claim 11, wherein:

the one or more broadcast signals are transmitted by broadcast towers; and the programmable circuitry is to estimate the signal strengths based on one or more of:

distances between a current position of a mobile device and the broadcast towers;

performance characteristics of the broadcast towers; and obstructions between the current position and the broadcast towers.

16. The non-transitory machine-readable storage medium of claim 11, wherein the programmable circuitry is to:

maintain a list of broadcast towers that transmit broadcast signals receivable by the antenna device; and prompt, in response to a change of broadcast towers on the list, the user to move the antenna device.

17. The non-transitory machine-readable storage medium of claim 11, wherein:

the antenna device is a first antenna device; and the programmable circuitry is to recommend, based on one or more receivability scores, that the user obtain a second antenna device, the second antenna device predicted to receive one or more broadcast signals with higher signal strength than the first antenna device.

18. A system comprising:

an antenna device to transmit an ultra-wide band (UWB) communication;

a display device to perform, when connected to the antenna device, a channel scan; and a mobile device comprising:

memory;

machine-readable instructions; and programmable circuitry to at least one of instantiate or execute the machine-readable instructions to:

determine a receivability score based on estimated signal strengths of one or more broadcast signals at a first position;

recommend a user place the antenna device at the first position while the antenna device is disconnected from the display device;

determine the antenna device is located at a second position based on the UWB communication;

update the receivability score based on estimated signal strengths at the second position; and report the receivability score to the user while the antenna device is disconnected from the display device.

19. The system of claim 18, wherein:

the first position and the second position are within a same building; and the programmable circuitry is to:

recommend the first position before the user begins a search to place the antenna device; and repeatedly update the receivability score and report the updated receivability score as the user moves throughout the building during the search.

20. The system of claim 18, wherein to determine the receivability score the programmable circuitry is to:

assign weights to the one or more broadcast signals based on user preference;

adjust weights to the one or more broadcast signals based on duplicative content; and combine the weighted signals strengths to form the receivability score.

* * * * *